US012374185B2

(12) United States Patent
Cohn et al.

(10) Patent No.: US 12,374,185 B2
(45) Date of Patent: *Jul. 29, 2025

(54) GAMING SYSTEMS AND METHODS USING DYNAMIC SYMBOL ARRAYS

(71) Applicant: LNW Gaming, Inc., Las Vegas, NV (US)

(72) Inventors: Kimberly Cohn, Las Vegas, NV (US); George Bouvier, Henderson, NV (US); Christopher Martinez, North Las Vegas, NV (US); Richard Milosevich, Las Vegas, NV (US); Madhu Nellore Babu, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,273

(22) Filed: Nov. 2, 2023

(65) Prior Publication Data

US 2024/0062616 A1 Feb. 22, 2024

Related U.S. Application Data

(63) Continuation of application No. 17/556,464, filed on Dec. 20, 2021, now Pat. No. 11,842,603.

(60) Provisional application No. 63/249,642, filed on Sep. 29, 2021.

(51) Int. Cl.
*G07F 17/32* (2006.01)
*G07F 17/34* (2006.01)

(52) U.S. Cl.
CPC .......... *G07F 17/3213* (2013.01); *G07F 17/34* (2013.01)

(58) Field of Classification Search
CPC .. G07F 17/3213; G07F 17/3267; G07F 17/34; G07F 17/326; G07F 17/3211
See application file for complete search history.

(56) References Cited

U.S. PATENT DOCUMENTS

| | | | |
|---|---|---|---|
| 6,186,894 | B1 | 2/2001 | Mayeroff |
| 8,277,307 | B2 | 10/2012 | Jensen et al. |
| 8,795,059 | B2 | 8/2014 | Aoki et al. |
| 8,827,796 | B2 | 9/2014 | Vermaak et al. |
| 9,679,444 | B2 | 6/2017 | Ryan |
| 10,102,710 | B2 | 10/2018 | Boese et al. |
| 10,255,151 | B1 | 4/2019 | Levin et al. |
| 10,410,477 | B2 | 9/2019 | Hoffman et al. |

(Continued)

*Primary Examiner* — Justin L Myhr

(57) ABSTRACT

A gaming machine comprises a display device that presents a symbol array comprising a plurality of symbol positions divided into a plurality of position subsets and game-logic circuitry that causes the display device to: present the symbol array in a first initial state by presenting at least one static symbol position in each position subset and randomly allocating a first set of allocated symbol positions, generate game cycle outcomes by populating the symbol positions, in response to a trigger event, expand a first position subset to include an expanded symbol position, and present the symbol array transitioning from a final state associated with a reset condition to a second initial state by removing expanded symbol positions and the allocated positions from the symbol positions in the final state and randomly allocating a second set of allocated symbol positions among the position subsets to include with the static symbol positions.

21 Claims, 17 Drawing Sheets

(56) References Cited

U.S. PATENT DOCUMENTS

| | | | |
|---|---|---|---|
| 10,553,068 B2 | 2/2020 | Zehetner | |
| 10,867,469 B2 | 12/2020 | Ceniceroz et al. | |
| 10,957,147 B1 | 3/2021 | Knight et al. | |
| 11,055,966 B2 | 7/2021 | Sanborn et al. | |
| 11,094,170 B2 | 8/2021 | Chesworth et al. | |
| 2007/0060261 A1 | 3/2007 | Gomez | |
| 2012/0172107 A1* | 7/2012 | Acres | G07F 17/34 463/16 |
| 2013/0065663 A1 | 3/2013 | Johnson et al. | |
| 2013/0102375 A1 | 4/2013 | Aoki et al. | |
| 2018/0225922 A1 | 8/2018 | Caputo | |
| 2019/0026978 A1 | 1/2019 | Shiraishi | |
| 2019/0051099 A1 | 2/2019 | Pawloski et al. | |
| 2020/0250923 A1 | 8/2020 | Ceniceroz et al. | |
| 2020/0265680 A1 | 8/2020 | Chan et al. | |
| 2021/0256812 A1 | 8/2021 | Kearns et al. | |

* cited by examiner

GAMING SYSTEMS AND METHODS USING DYNAMIC SYMBOL ARRAYS

CROSS-REFERENCE TO RELATED APPLICATIONS

This application is a continuation of U.S. patent application Ser. No. 17/556,464, filed Dec. 20, 2021 and issued as U.S. Pat. No. 11,842,603, which claims the benefit of priority to U.S. Provisional Patent Application No. 63/249,642, filed Sep. 29, 2021, both the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2021, SG Gaming, Inc.

FIELD

The present disclosure relates generally to gaming systems, apparatus, and methods and, more particularly, to game features including dynamic symbol arrays.

BACKGROUND

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

As the industry matures, the creativity and ingenuity required to improve such operation of gaming apparatus and games grows accordingly.

SUMMARY

According to one aspect of the present disclosure, a gaming machine primarily configured to conduct a game is provided. A gaming machine comprises a display device and game-logic circuitry in communication with the display device. The display device presents a symbol array comprising a plurality of symbol positions divided into a plurality of position subsets. The symbol positions comprise static symbol positions and a first set of allocated symbol positions in a first initial state of the symbol array. The game-logic circuitry causes the display device to: (i) present the symbol array in the first initial state by presenting the static symbol positions such that each position subset includes at least one of the static symbol positions and randomly allocating the first set of allocated symbol positions among the position subsets, (ii) generate one or more game cycle outcomes by populating the plurality of symbol positions with a plurality of randomly selected symbols from a set of available symbols, (iii) in response to a trigger event associated with a first position subset, expand the first position subset to include at least one expanded symbol position, and (iv) in response to a reset condition, present the symbol array transitioning from a final state associated with the reset condition to a second initial state by removing any expanded symbol positions and the first set of allocated symbol positions from the symbol positions in the final state and randomly allocating a second set of allocated symbol positions among the position subsets. The symbol positions in the second initial state include the static symbol positions and the second set of allocated symbol positions.

According to another aspect of the present disclosure, a method for conducting and presenting a game using a gaming system is provided. The gaming system includes game-logic circuitry and a gaming machine primarily configured to conduct a game that includes a display device in communication with the game-logic circuitry. The method comprises presenting, by the display device, a symbol array comprising a plurality of symbol positions divided into a plurality of position subsets, wherein the symbol positions comprise static symbol positions and a first set of allocated symbol positions in a first initial state of the symbol array. The method further comprises causing, by the game-logic circuitry, the display device to: (i) present the symbol array in the first initial state by presenting the static symbol positions such that each position subset includes at least one of the static symbol positions and randomly allocating the first set of allocated symbol positions among the position subsets, (ii) generate one or more game cycle outcomes by populating the symbol positions with a plurality of randomly selected symbols from a set of available symbols, (iii) in response to a trigger event associated with a first position subset, expand the first position subset to include at least one expanded symbol position, and (iv) in response to a reset condition, present the symbol array transitioning from a final state associated with the reset condition to a second initial state by removing any expanded symbol positions and the first set of allocated symbol positions from the symbol positions in the final state and randomly allocating a second set of allocated symbol positions among the position subsets. The symbol positions in the second initial state include the static symbol positions and the second set of allocated symbol positions.

According to a further aspect of the present disclosure, a gaming system comprises a gaming machine primarily configured to conduct a game and game-logic circuitry. The gaming machine comprises a display device in communication with the game-logic circuitry and configured to present a symbol array comprising a plurality of symbol positions divided into a plurality of position subsets, wherein the symbol positions comprise static symbol positions and a first set of allocated symbol positions in a first initial state of the symbol array. The game-logic circuitry is configured to cause the display device to: (i) present the symbol array in the first initial state by presenting the static symbol positions such that each position subset includes at least one of the static symbol positions and randomly allocating the first set of allocated symbol positions among the position subsets, (ii) generate one or more game cycle outcomes by populating the symbol positions with a plurality of randomly selected symbols from a set of available symbols, (iii) in response to a trigger event associated with a first position subset, expand the first position subset to include at least one expanded symbol position, and (iv) in response to a reset condition, present the symbol array transitioning from a final state associated with the reset condition to a second initial state by removing any expanded symbol positions and the first set of allocated symbol positions from the symbol positions in the final state and randomly allocating a second set of allocated symbol positions among the position subsets. The symbol positions in the second initial state include the static symbol positions and the second set of allocated symbol positions. The gaming system may be incorporated into a single, freestanding gaming machine.

Additional aspects of the present disclosure will be apparent to those of ordinary skill in the art in view of the detailed description of various embodiments, which is made with reference to the drawings, a brief description of which is provided below.

Figure 1:
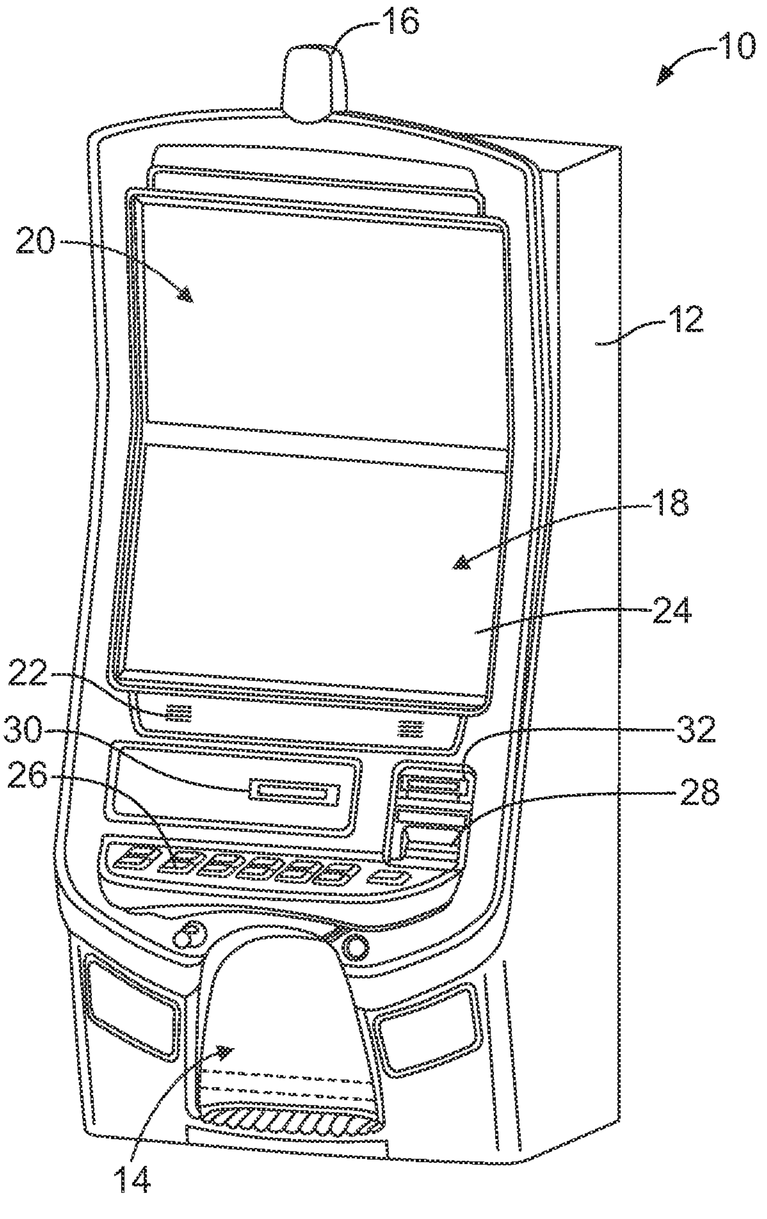
FIG. 1 is a perspective view of a free-standing gaming machine according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

At least some embodiments of the present invention comprise an innovative application of data processing steps that, when implemented by game-logic circuitry, direct an electronic display device to present a game feature utilizing dynamic symbol arrays and/or value-bearing symbols that minimizes processing overhead by utilizing numbered indicia to represent credit values and/or other visible award indica instead of complex, fanciful game images. The game feature includes unique features based on visible changes to the symbol array, such as randomized initial states and awards based on changes to the array configuration (i.e., adding or removing symbol positions), that provide additional functionality and presentation beyond known gaming systems in a manner readily understood by players without requiring additional complex computing burdens placed upon the game-logic circuitry. That is, the awards (including non-credit awards) are provided based on changes to the array and/or the presence of value-bearing symbols without incorporating complex analysis of symbol combinations, additional random number generation, and the like that burden the resources of the game-logic circuitry that would otherwise be available for use in other functions of the gaming system. The embodiments described herein represent both desirable game functions for players (i.e., dynamic games that are readily understood through the presentation) and a technical solution to gaming systems by providing such dynamic game features with a unique presentation and underlying game-logic without introducing inefficient resource burdens. Embodiments of the present invention provide a straightforward, what-you-see-is-what-you-get (WYSIWYG) visual presentation that is simple to understand and, therefore, effective in generating player excitement and enthusiasm. The result is a highly flexible dynamic array and/or value-aggregation process that can be easily adapted to any theme/brand while remaining easily understood by players.

The foregoing systems and methods described herein include game features with dynamic symbol arrays. That is, the symbol arrays described herein are configured to add or remove symbol positions in response to one or more trigger events. The changes to the symbol positions of the symbol array may be used to progress towards one or more awards, where meeting or exceeding a threshold symbol position, column size, row size, and/or other suitable threshold measurements of the array cause the awards to be provided. The changes to the array may continue for a predetermined number of game cycle outcomes (i.e., spins). In some embodiments, at the conclusion of the predetermined number of game cycle outcomes, the game feature concludes. In other embodiments, the game feature may continue by resetting the array to an initial state. The initial state may be a previous initial state, or the initial state may be dynamically determined each time the array is reset as described herein.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a “Max Bet” button or soft key to indicate a player’s desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
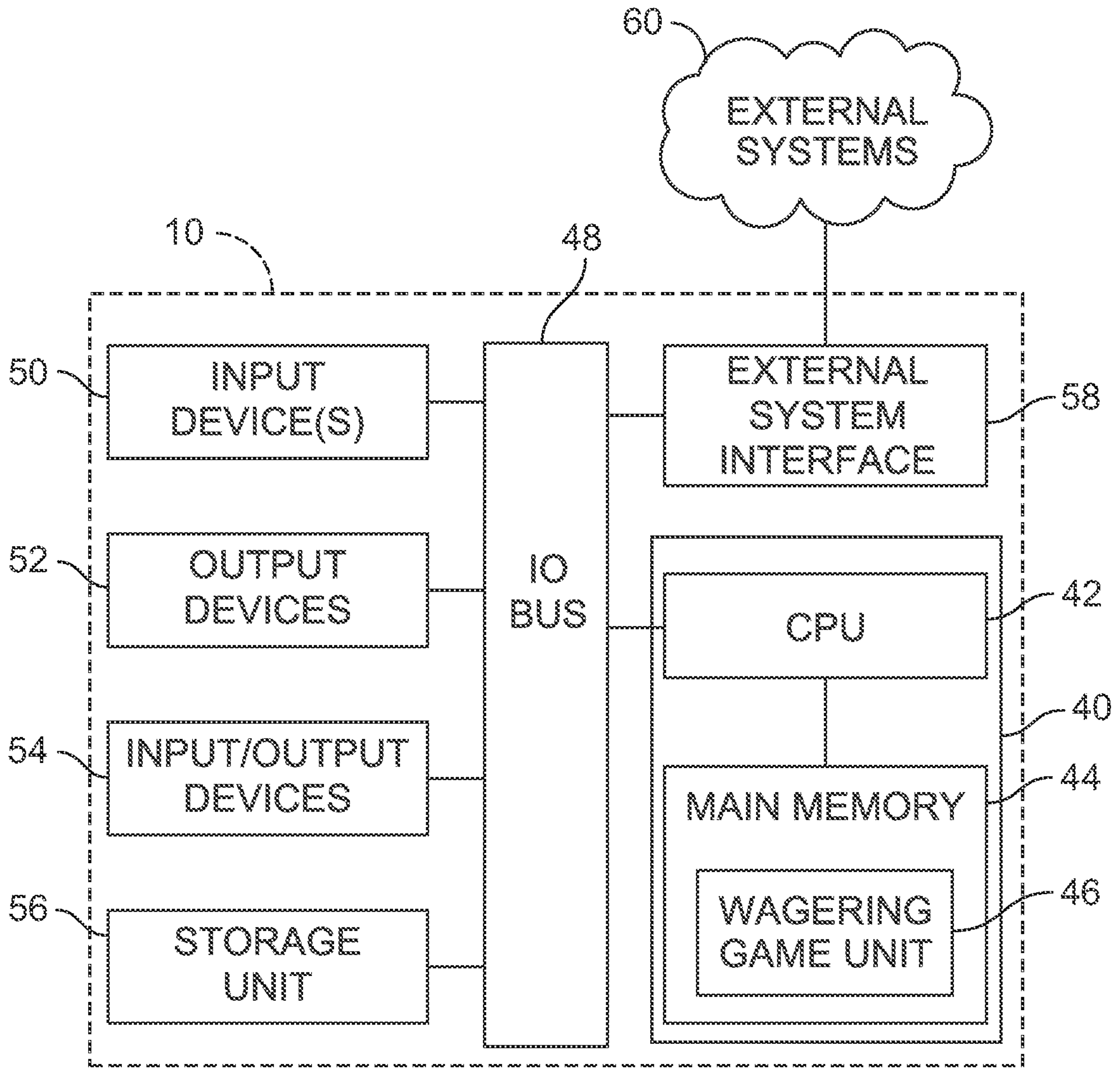
FIG. 2 is a schematic view of a gaming system according to one or more embodiments of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.) —all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
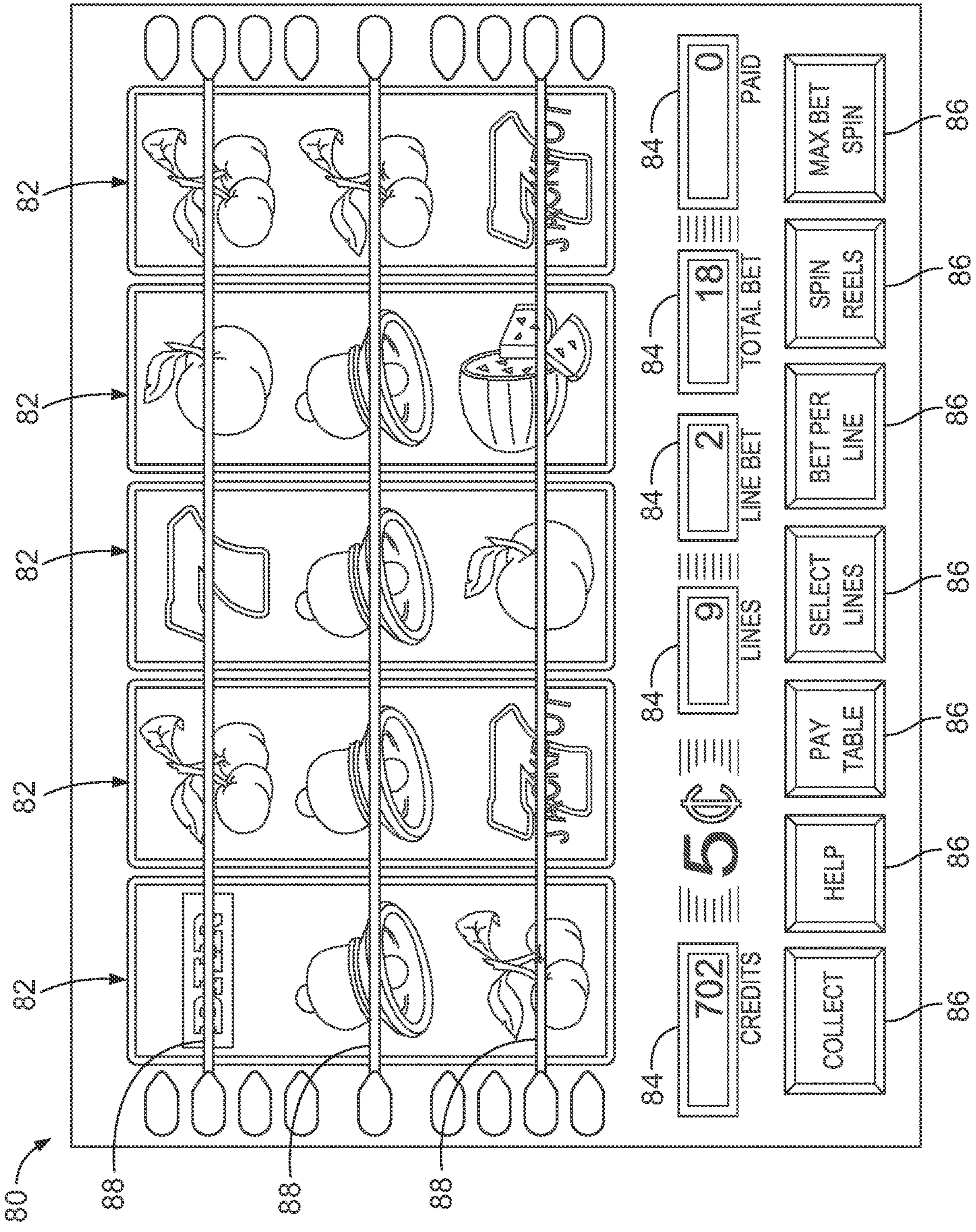
FIG. 3 is an image of an exemplary basic-game screen of a wagering game displayed on a gaming machine, according to one or more embodiments of the present disclosure.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

In at least some embodiments, the gaming systems and methods include a game feature utilizing dynamic symbol arrays. The dynamic symbol array adds or removes symbol positions in response to one or more trigger events, wherein the addition and/or removal of the symbol positions may be random or based on the specific trigger event. In response to reaching or exceeding a threshold array size, symbol position, and/or other suitable configuration of the array, the game feature may provide an award, unlock an additional game feature, and the like.

In at least some embodiments, the game feature is configured to reset the symbol positions of the symbol array from a final state at which a reset condition is detected to an initial state by removing at least some symbol positions (e.g., symbol positions added via the trigger events described above) and adding a new set of symbol positions. In some embodiments, some symbol positions remain within the symbol array after the transition to the initial state, while other symbol positions are randomly allocated to the symbol array in the initial state. As a result, each time the symbol array is reset to a new initial state, the configuration of the symbol positions within the symbol array may be different or the same as previous initial states.

Figure 4:
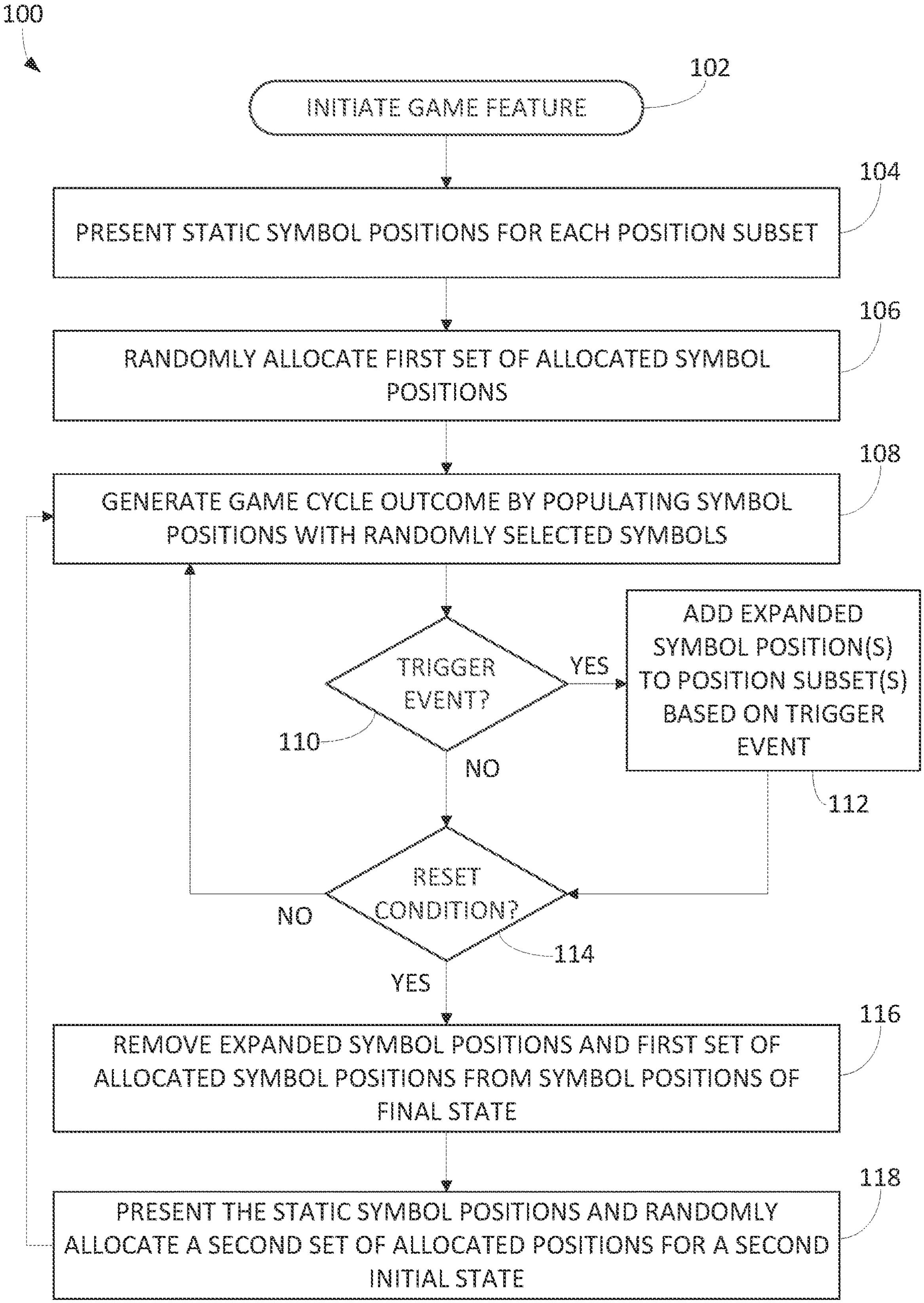
FIG. 4 is a flow diagram of an example method of conducting and presenting a game including dynamic arrays using a gaming system, according to one or more embodiments of the present disclosure.

FIG. 4 is a flow diagram of an example method 100 for conducting a game feature with a dynamic symbol array using a gaming system (e.g., the system shown in FIGS. 1 and 2). The method 100 is at least partially performed by game-logic circuitry of the gaming system (e.g., the game-logic circuitry 40, shown in FIG. 2). The game-logic circuitry is in communication with one or more display devices and/or other presentation devices (e.g., lighting assemblies, speakers, etc.) to present game elements as described herein. It is to be understood that although the steps of the method 100 are described using a display device to present all of the display elements, other configurations where the presentation elements are divided between multiple display devices (including overlapping display devices, such as an electronic display overlapping a mechanical reel arrangement) are considered to be within the spirit and scope of the present disclosure. In other embodiments, the method 100 is at least partially performed by another suitable device of the gaming system and/or includes additional, fewer, or alternative steps, including those devices and steps described elsewhere herein.

At step 102, the game feature is initiated. In some embodiments, the game feature is a base game feature of a game, where play of the game defaults to the game feature associated with the method 100. In such embodiments, initiating the game feature may be in response to a player initiating a gaming session at a gaming machine. In embodiments in which the game is a wagering game, the player may be required to provide a credit input to establish a credit balance to facilitate placing wagers and receiving credit awards. The credit input may be one or more physical items (e.g., ticket, card, coin, bill, etc.) provided to a corresponding credit input device of the gaming machine, or the credit input may be provided by linking an account or digital wallet associated with the player to the gaming session. In some examples, the player links a mobile computing device (e.g., a smartphone) to the gaming machine through a network interface and/or other sensor interfaces (e.g., presenting or scanning an audible or visual code) to establish the credit balance. In other examples, the mobile computing device may communicate with an external device, such as a gaming or accounting server system associated with the gaming machine to establish the credit balance.

In other embodiments, the game feature associated with the method 100 is a bonus game feature, where initiating the game feature is in response to one or more bonus game trigger events occurring within another game feature (e.g., a base game feature). The bonus game trigger may be, for example and without limitation, detecting a particular symbol or combination of symbols in a game cycle outcome, detecting a wager amount or frequency of the player has met a threshold value, receiving player input, and/or other suitable events or conditions associated with the game.

In response to initiating the game feature, the game-logic circuitry causes the display device to present an array of symbol positions in a first initial state through steps 104 and 106 as described herein. In the example embodiment, the array includes a plurality of columns and rows of symbol positions arranged together to form a single array. In other embodiments, the array may include separate groups or subarrays of symbol positions organized in any suitable manner in accordance with the features described herein. In further embodiments, the array may be presented as a different presentation element composed of a plurality of segments, such as a segmented wheel or set of wheels.

In at least some embodiments, the symbol positions of the symbol array are divided into a plurality of position subsets. In the example embodiment, a position subset is a column of the symbol array. In other embodiments, the position subsets may be rows of the symbol and/or other suitable groups of symbol positions. In certain embodiments, the symbol positions within a subset are not necessarily positionally related, but rather may be grouped using other characteristics. In one example, the symbol positions may include color backgrounds or other suitable presentation elements to identify the corresponding position subset.

The "state" of the symbol array as used herein includes the number of symbol positions in each column and/or row of the array. For a rectangular or square array, this may be represented as "3×5" as an example, where the array includes 3 rows and 5 columns. In non-uniform arrays, other suitable descriptions may be used to convey the size and shape of the array and the array subsets. The state may include other conditions or parameters of the array, such as identifying symbol positions having additional or alternative features or functionalities. In certain embodiments, the state of the array may also reflect of aspects of the game corresponding to the array. For example, a "final state" of the array may be a state immediately prior to concluding or resetting the game feature as described herein. The state of the symbol positions may be used herein interchangeably with the state of the symbol array, and "configuration" of the symbol array may also be used to describe the arrangement of the symbol positions. In some embodiments, the initial state of the array is predefined such that the initial state is the same each time the game feature is initiated. In other embodiments, the initial state is dynamically determined each time the game feature is initiated as described herein.

At step 104, the display device presents at least one static symbol position in each position subset. The static symbol positions are symbol positions that remain part of the active symbol array through all states of the array. In certain embodiments, the static symbol positions may be removed, or new static symbol positions added in response to particular game events associated with the static symbol positions. In one example, the static symbol positions are randomly assigned each time the game feature is initiated at step 102. In at least some embodiments, a portion or all of the positions subsets include more than one static symbol position. In one example, three position subsets include two static symbol positions and two position subsets include one static symbol position. In other embodiments, a portion of or all the position subsets include no static symbol position such that these position subsets are filled with other types of symbol positions described herein. In further embodiments, particularly embodiments in which position subsets overlap (e.g., an array include position subsets for each row and each column), the static symbol positions may be shared between a plurality of position subsets.

In the example embodiment, the static symbol positions occupy each column of the array at the lowest positions of the column to facilitate the expansion of the columns as described herein. In other embodiments, the static symbol positions may be located at different positions within the array and the respective position subsets to facilitate the features described herein. In one example, the static positions are located centrally within each position subset to facilitate expansion in two directions.

At step 106, the logic circuitry causes the display device to randomly allocate a first set of allocated symbol positions among the position subsets. The allocated symbol positions are symbol positions that are activated at an initial state of the game feature to be included with the static symbol positions. Due to the random allocation of the allocated symbol positions, each initial state of the array may be different or the same as one or more previous initial states as described herein. The number of allocated symbol positions in the first set may be a predefined number or a variable number. In one example, the first set of allocated symbol positions is fifteen such that fifteen symbol positions are allocated among the position subsets. In another example, the number of symbol positions is randomly selected from a range of ten to twenty symbol positions. In a further example, the number of symbol positions is based at least partially on wager characteristics (e.g., wager amount and/or frequency), player history, game history, and the like.

The random allocation of the symbol positions may be executed through any suitable means. In one example, for each allocated symbol position, one or more random numbers are generated to identify which position subset is to include the allocated symbol position. In another example, the logic circuitry may store a number of predefined configurations or allocations of the allocated symbol positions such that one of the predefined configurations is randomly selected to allocate the first set. In certain embodiments, the first set of allocated symbols are not randomly allocated or only partially randomly allocated. That is, the allocation of at least a portion of the first set may be based on player input, wager characteristics, player history, game history, and/or other suitable variables related to the game feature. In one example, the player is provided the option to allocate five of the fifteen symbol positions of the first set while the remaining ten positions are randomly allocated. In such embodiments including non-random allocation, the logic circuitry may store one or more rules that prevent the non-random allocation from favoring a particular position subset.

As a result of the random allocation and the static symbol positions, some position subsets may include more symbol positions than other position subsets in some initial states. In other initial states, the position subsets may each include the same number of symbol positions. That is, the symbol array in the first initial state may include one of a plurality of configurations of the symbol positions, thereby facilitating a dynamic game feature.

In addition to presenting the array, other game elements may be presented in response to initiating the game feature. In the example embodiment, the display device presents a plurality of subset awards and a game cycle counter. Each subset award is associated with one or more of the position subsets. In at least some embodiments, the association between the subset award and a position subset is depicted within the game interface based on a positional relationship between the award and the position subset. In the example embodiment, each column is associated with a subset award positions above the column.

The subset awards are provided in response to a respective award event associated with the corresponding position subset. In at least some embodiments, the award events include expanding or otherwise changing the position subset to include an award position. In the example embodiment, as described herein, the award position is reached by expanding a column to include the highest symbol position (located adjacent the subset award). In other embodiments, other suitable award events are included within the game feature.

The game cycle counter monitors the number of game cycles within the game feature. As described herein, the game feature has a limited length before the game feature is reset or concluded. In one example, the length of the game feature is ten game cycle outcomes. In other examples, other suitable game lengths may be used. In some embodiments, the game cycle counter is initiates at a predefined initial count increments or decrements for each game cycle outcome of the game feature until a termination count is reached or exceeded irrespective of play of the game feature. In other embodiments, the game cycle counter may be dynamic in response to play of the game feature, where the initial count, the increment or decrement, and/or the termination count may be adjusted within the game feature. The game cycle counter may only count game cycle outcomes of the game feature such that game cycle outcomes of bonus game features are not counted.

At step 108, the logic circuitry begins play of the game feature by generating a game cycle outcome and causing the display device to present the game cycle outcome. More specifically, the game cycle outcome includes populating the symbol positions of the array (i.e., the static symbol positions and the first set of allocated symbol positions) with randomly selected symbols from a set of available symbols. In at least some embodiments, the set of available symbols include a plurality of symbol-bearing reel strips, where each reel strip is associated with one or more symbol positions. The reel strips are animated to "spin" and stop to generate the game cycle outcome. In other embodiments, the symbol positions are populated with randomly selected symbols via other means, including means without the use of reel strips.

In some embodiments, the game cycle counter is updated at step 108 to count the game cycle outcome by incrementing or decrementing towards a termination count. In other embodiments, the game cycle counter is updated before, during, or after any of the steps 108-114 as described herein. Similarly, the logic circuitry may determine any winning outcomes from the game cycle outcome through any of the steps 108-114. The winning outcomes may include, for example, payline outcomes, scatter pays, and the like. In certain embodiments, the following steps may affect the resulting outcome by adding or removing symbol positions such that the winning outcome determination is withheld until the state of the array is updated or the winning outcome determination is updated in response to the changes to the array. The winning outcomes may be presented to the player via one or more animations and/or presentation elements, including animations and presentation elements presented by the display device.

In response to the game cycle outcome, the logic circuitry determines at step 110 whether the symbols of the game cycle outcome include any trigger events. The trigger event may include, for example, one or more special symbols occupying the symbol positions. These special symbols may be referred to herein as "trigger symbols," though these trigger symbols may have other effects on the game feature beyond indicating the trigger event as described herein. For example, the trigger symbols may be used to determine any winning outcomes from the game cycle outcome. In the example embodiment, the set of available symbols includes one or more types of trigger symbols associated with different trigger events and/or resulting actions as described herein. The trigger events and resulting actions are not based solely on the trigger symbols, but also are based on the location of the trigger symbols within the symbol array.

In the example embodiment, at step 112, if a trigger symbol is detected (i.e., a trigger event), the array is configured to add or remove one or more symbol positions based on the trigger event. In this example, the trigger symbol visually identifies the corresponding change to the symbol array to the player. That is, the trigger symbol may include indicia such as (and without limitation) "UP," "UP 2," "UP LEFT," "UP ALL," or "DOWN." The "UP" indicia indicate the position subset including the trigger symbol is expanded by adding one expanded symbol position to the position subset. Expanded symbol positions as used herein refer to any symbol positions added to the active symbol array following the initial state through play of the game feature. Similarly, "UP 2" also indicates adding expanded symbol positions to the subset but adds two expanded symbol positions instead of one. "UP LEFT" and "UP ALL" are trigger symbols that impact position subsets other than or in addition to the subset including the trigger symbols. More specifically, "UP LEFT" adds an expanded symbol position to the position subset to the left of the position subset occupied by the trigger symbol, and "UP ALL" adds one or more expanded symbol positions to every position subset. "DOWN" is a trigger symbol that removes one or more symbol positions from the position subset. In certain embodiments, the removal of symbol positions may be limited to only expanded symbol positions or only expanded and allocated symbol positions.

In some embodiments, the trigger symbols are overlaid on other symbols such that the trigger symbols disappear after the trigger events are processed, thereby leaving the other symbols to be included within the winning outcome determinations. It is to be understood that the underlying symbols in this context include both symbols that are occupied by the trigger symbols during generation of the game cycle outcome (e.g., the trigger symbols are applied to reel positions on reel strips already occupied by other symbols) and symbols that are randomly selected as replacements for any trigger symbols in the game cycle outcome. In other embodiments, the trigger symbols do not overlap other symbols and may be included within winning outcome determinations.

In other embodiments, such as embodiments with trigger events that do not use trigger symbols or combinations of trigger symbols, the addition or removal of symbol positions may be based on other aspects of the trigger events. In some embodiments, the resulting action (e.g., step 112) is not based on the trigger event, but rather is randomly selected from a plurality of predetermined actions.

Between steps 112 and 114, the logic circuitry determines whether to award any of the subset awards based on the changes to the symbol positions of the symbol array. In at least some embodiments, if a position subset has been expanded to an award position, the logic circuitry awards the subset award corresponding to the award position. In the example embodiment, the award positions are at the top of each column such that expanded the columns to include the top symbol positions triggers the corresponding subset award. The subset awards may include a credit award, a free game cycle outcome award, a symbol award, a bonus game feature award, a jackpot award, and/or other suitable awards. The display device is configured to present one or more animations or presentation elements to visually indicate the subset award achievement to the player. In at least some embodiments, the provided subset award may be removed or changed to limit or otherwise prevent the award from being continually awarded through the game feature.

Following step 112 or determining at step 110 that no trigger event is present, the logic circuitry determines at step 114 whether a reset condition is present. In the example embodiment, the reset condition is expiration of the predetermined number of game cycle outcomes defined by the game cycle counter. In other embodiments, additional or alternative suitable reset condition may be considered at step 114. For example, other reset conditions may include collecting a predetermined number of reset symbols, failing to collect a predetermined number of continuation symbols, achieving an array state where no additional expansion of the array is possible, and the like. If no reset condition is present, play of the game feature continues by repeating steps 108-114 for at least one additional game cycle outcome until a reset condition is identified.

If a reset condition is determined to be present, the logic circuitry begins to reset the symbol positions of the symbol array through steps 116 and 118. More specifically, at step 116 the logic circuitry causes the display device to remove any expanded symbol positions and the first set of allocated symbol positions from the symbol positions of the symbol array in a final state. The final state of the array in this context is the state of the array at the time of reset condition being detected. In such embodiments, the removal of the expanded and allocated symbol positions leaves only the static symbol positions remaining. In embodiments with no static symbol positions, all the symbol positions of the symbol array may be removed. In other embodiments, at least some of the expanded symbol positions and/or the first set of allocated symbol positions from the final state remain.

At step 118, the logic circuitry causes the display device to present the symbol array in a second initial state. That is, the display device presents the static symbol positions in combination with a second set of allocated symbol positions that are randomly allocated among the position subsets. The first and second sets of allocated symbol positions may be the same or different. More specifically, the first and second sets of allocated symbol positions may include the same or different number of symbol positions to allocated and/or distribute the allocated symbol positions in the same configuration or a different configuration. Even if the number of symbol positions to allocate is the same, the configuration of the symbol positions may be different based on the random allocation.

In addition to step 118, the game cycle counter and any altered or inactive subset awards may be reset. The game cycle counter may be reset to a predefined initial count or a randomly determined initial count, and the subset awards may be reset to predefined awards or an award selected from a set of available awards. The game feature may then continue through a second set of game cycle outcomes by repeating steps 108-114 until another reset condition is detected, which causes the symbol array to be reset again. The game feature may continue until the gaming session is terminated (e.g., the player initiating a payout sequence or no remaining credits within the credit balance of the player) or a termination condition is met, particularly for embodiments of the game feature in which the game feature is a bonus game feature.

FIGS. 5A-5G depict an example game interface 200 of a game feature using dynamic symbol arrays. The game interface 200 is provided by a gaming system, such as the gaming system shown in FIGS. 1 and 2. The game interface 200 is presented by one or more display device in communication with game-logic circuitry. In other embodiments, the gaming system is configured to present game interfaces having additional, fewer, or alternative presentation elements in comparison to the presentation elements of the game interface 200, which may be based on a different configuration of the game feature described herein.

Figure 5A:
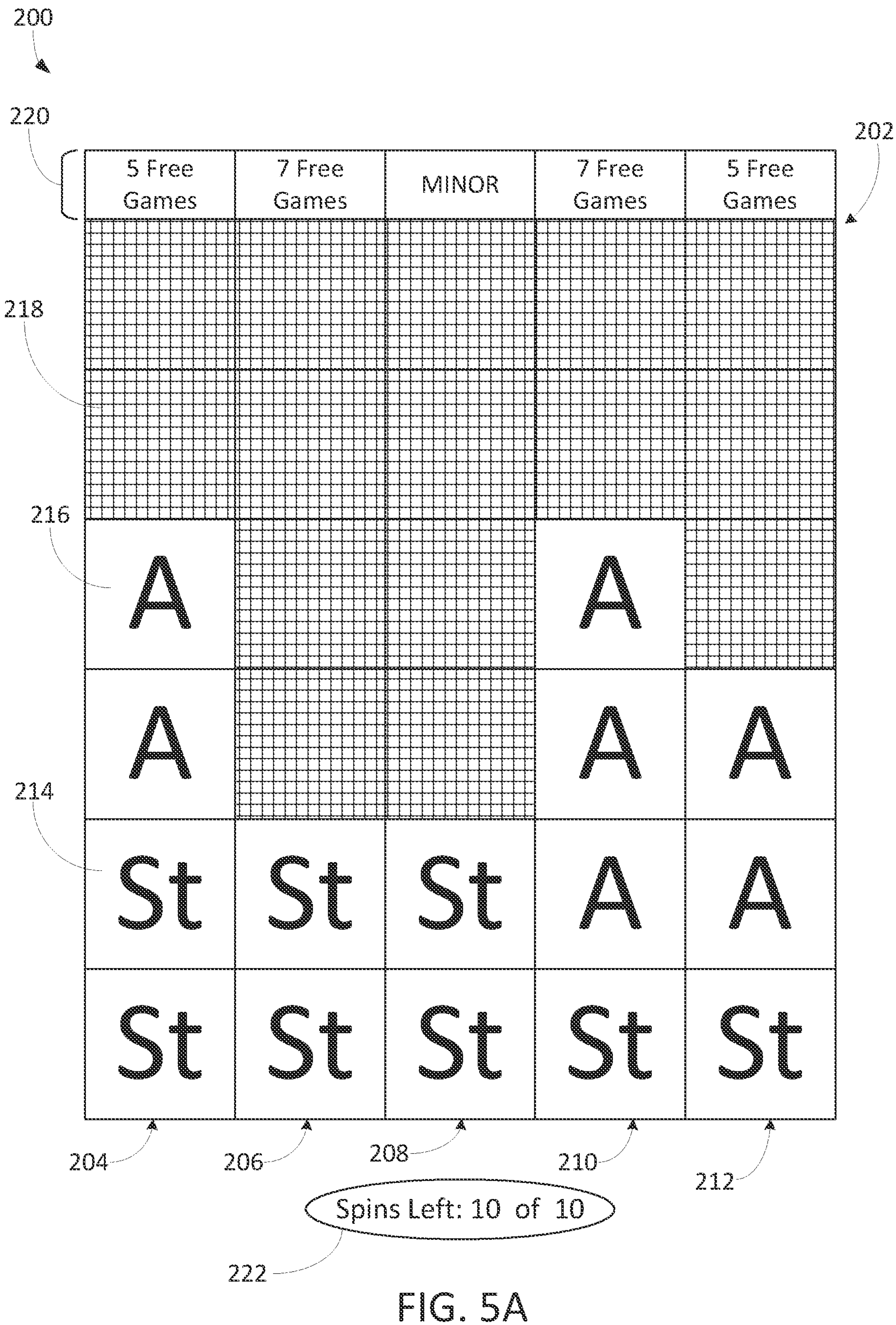
FIG. 5A is an example game interface of an exemplary game feature using a dynamic symbol array in a first initial state, according to one or more embodiments of the present disclosure.

FIG. 5A depicts the game interface 200 in a first initial state. The game interface 200 includes a symbol array 202. The symbol array 202 includes a plurality of symbol positions divided into five columns 204, 206, 208, 210, 212 (i.e., position subsets). In other embodiments, the symbol array 202 includes a different configuration of symbol positions or position subsets, such as a different number of columns or rows. The plurality of symbol positions includes static symbol positions 214 and allocated symbol positions 216 in the first initial state.

In the example embodiments, the first three columns 204, 206, 208 include two static symbol positions 214, and the last two columns 210, 212 include one static symbol position 214. The static symbol positions 214 remain active through all states of the symbol array 202 and are positioned at the lowest positions of the columns 204-212 such that other types of symbol positions are above the static symbol positions 214. In other embodiments, the symbol array 202 includes the static symbol positions 214 in a different configuration. In one example, at least one of the columns 204-212 does not include a static symbol position 214. In another example, the static symbol positions 214 are not biased to the base of the symbol array 202. In certain embodiments, the symbol array 202 does not include static symbol positions. In such embodiments, the symbol array 202 in the first initial state includes only allocated symbol positions 216.

The allocated symbol positions 216 are symbol positions randomly allocated among the columns 204-212 in the initial states of the symbol array 202. In some embodiments, the number of allocated symbol positions 216 is predetermined (e.g., between two and twenty symbol positions) and remains the same between each initial state as described herein. In other embodiments, the number of allocated symbol positions is dynamic. In one example, the number of allocated symbol positions 216 is randomly selected from a range of values. In another example, the number of allocated symbol positions 216 is based on parameters related to the game feature, such as game history or wager history.

In the example embodiment, seven allocated symbol positions 216 are distributed among the columns 204-212 for the first initial state. The first and fifth columns 204, 212 include two allocated symbol positions 216, the fourth column 210 includes three allocated symbol positions 216, and the second and third columns 206, 208 include no allocated symbol positions. 216. Other initial states may distribute the allocated symbol positions 216 in the same configuration or a different configuration, such as a configuration resulting in a rectangular symbol array 502.

As described herein, the static symbol positions 214 and the allocated symbol positions 216 are selectively populated by randomly selected symbols. The symbols are randomly selected from one or more sets of available symbols. In one example, the game-logic circuitry stores one or more weighted table of symbols or combinations of symbols and, based on one or more random outcomes, selects symbols or combinations of symbols from the table. For embodiments with a plurality of tables, a table is selected in response to one or more parameters associated with the game feature. For example, the table may be selected based on the wager amount or frequency of the player, state of the symbol array 202, and/or the performance of the player in the game feature. In at least some embodiments, the symbols are selected from symbol-bearing reel strips, where each reel strip is associated with one or more symbol position. In one example, each column 204-212 is associated with a respective reel strip. In another example, each symbol position is associated with a respective reel strip. In other embodiments, the symbol positions are populated using means other than symbol-bearing reel strips to populate the symbol positions.

To generate game cycle outcomes (i.e., spins), the display device presents one or more animations and/or presentation elements to visually indicate to the player the symbol population of the symbol positions of the at least the active symbol array 202 (i.e., in the first initial state, the static symbol positions 214 and the allocated symbol positions 216). As the symbols settle or stop within a symbol position, the game cycle outcome is presented. The game-logic circuitry may generate the game cycle outcome in advance of the game cycle outcome being presented. In certain embodiments, the game-logic circuitry generates a plurality of game cycle outcomes at once and then causes the display device to present the generated game cycle outcomes sequentially. Within each game cycle outcome, the game-logic circuitry is configured to detect or identify any winning outcomes from the symbols populating the symbol array and/or other events, such as the trigger events or award triggers described herein.

In at least some embodiments, the game interface 200 includes inactive symbol positions 218. The inactive symbol positions 218 are symbol positions not within the current active symbol array 202. The combination of the inactive symbol positions 218 and the active symbol array 202 define the maximum dimensions of the symbol array 202. In other embodiments, the symbol array 202 and/or the inactive symbol positions 218 may be expanded or contracted in response to play of the game feature such that additional symbol positions may be revealed or some of the symbol positions in FIG. 5A may be removed, thereby dynamically changing the maximum dimensions of the symbol array 202.

The inactive symbol positions 218 are symbol positions that are either not populated with symbols or symbols populating the inactive symbol positions 218 are not included within a game outcome determination. That is, winning outcomes, trigger events, and the like from a game cycle outcome do not include symbols from inactive symbol positions 218. The display device is configured to visually distinguish the inactive symbol positions 218 from other types of symbol positions within the symbol array 202. For example, and without limitation, the inactive symbol positions 218 may be visually hidden, greyed out, transparent or translucent, and/or include a visually distinctive background. In some embodiments, the inactive symbol positions 218 are populated by symbols in each game cycle outcome such that every symbol position of the game interface 200 includes a symbol. In other embodiments, the inactive symbol positions are not populated with symbols. For clarity purposes, FIGS. 5A-5G do not depict the symbols within the inactive symbol positions 218. In other embodiments, other suitable configurations and presentations of the inactive symbol positions 218 may be used.

The inactive symbol positions 218 are configured to be selectively included in the active symbol array 202 based on play of the game feature as described herein. Adding an inactive symbol position 218 to the array 202 may change the corresponding type of symbol position, which may result in a visual change to inactive symbol position 218 to incorporate with the other positions of the array 202. In certain embodiments, symbol positions of the active symbol array 202 may be removed from the array 202 by converting these symbol positions into inactive symbol positions 218. In such embodiments, this change in the state of the symbol positions of the array 202 is reflected through one or more visual changes or animations presented via the game interface 200.

In the example embodiment, the game interface 200 includes a plurality of award identifiers 220. More specifically, each column 204-212 or position subset is associated with a respective award identifier 220. In other embodiments, at least one position subset is associated with a plurality of award identifiers 220, or at least one award identifier 220 is associated with a plurality of position subsets. In certain embodiments, the award identifiers 220 are not associated with position subsets, but rather may be associated with a different subset of the symbol array 202 (and/or one of the inactive symbol positions 218). The award identifiers 220 visually indicate associated awards that are provided in response to respective award triggers being detected. One example award trigger includes expanding a column of the array 202 to a top position (i.e., an award position).

In the example embodiment, the awards associated with the award identifiers include bonus game feature having a predetermined number of free games or a jackpot award (i.e., "MINOR" is a minor jackpot award). In other embodiments, additional, fewer, or alternative awards may be used, such as credit awards, jackpot awards, additional game cycle awards, modifier awards, bonus game feature awards, and/or symbol awards.

The game interface 200 further includes a game cycle counter 222 that monitors the number of game cycle outcomes of the game feature. In the example embodiment, the game-logic circuitry "resets" the symbol array 202 after a number of game cycle outcomes as described herein. The number of game cycle outcomes may be predetermined (e.g., 5, 10, or 15), or may be dynamic, where the number of game cycle outcomes is adjustable based on game events, wager history, game history, player history, and the like. The game cycle counter 222 provides a visual indicator to the player of the progress towards the next reset of the array 202. In the example embodiment, ten spins or game cycle outcomes are provided, and the game cycle counter 222 decrements in response to each game cycle outcome presented via the game interface 200. It is to be understood that other suitable game cycle counter 222 are considered within the spirit and scope of the present disclosure, such as game cycle counters 222 that indicate the current count using graphical elements rather than text or counters 222 that increment rather than decrement for each game cycle outcome. In certain embodiments, the game cycle counters 222 are configured to count a subset of the game cycle outcomes, such as game cycle outcomes having or lacking certain symbols and/or symbol combinations.

In at least some embodiments, other presentation elements may be provided within the game interface 200. In one example, the game interface 200 includes one or more presentation elements for displaying the credit balance of the player and/or any awards to be provided to the player. In other embodiments, the presentation elements of the game interface 200 may be presented in an alternative configuration, include additional features and/or presentation elements, and/or are hidden in one or more states. In one example, at least some of the inactive symbol positions 218 are hidden until the active symbol array 202 is expanded to include the inactive symbol positions 218.

Figure 5B:
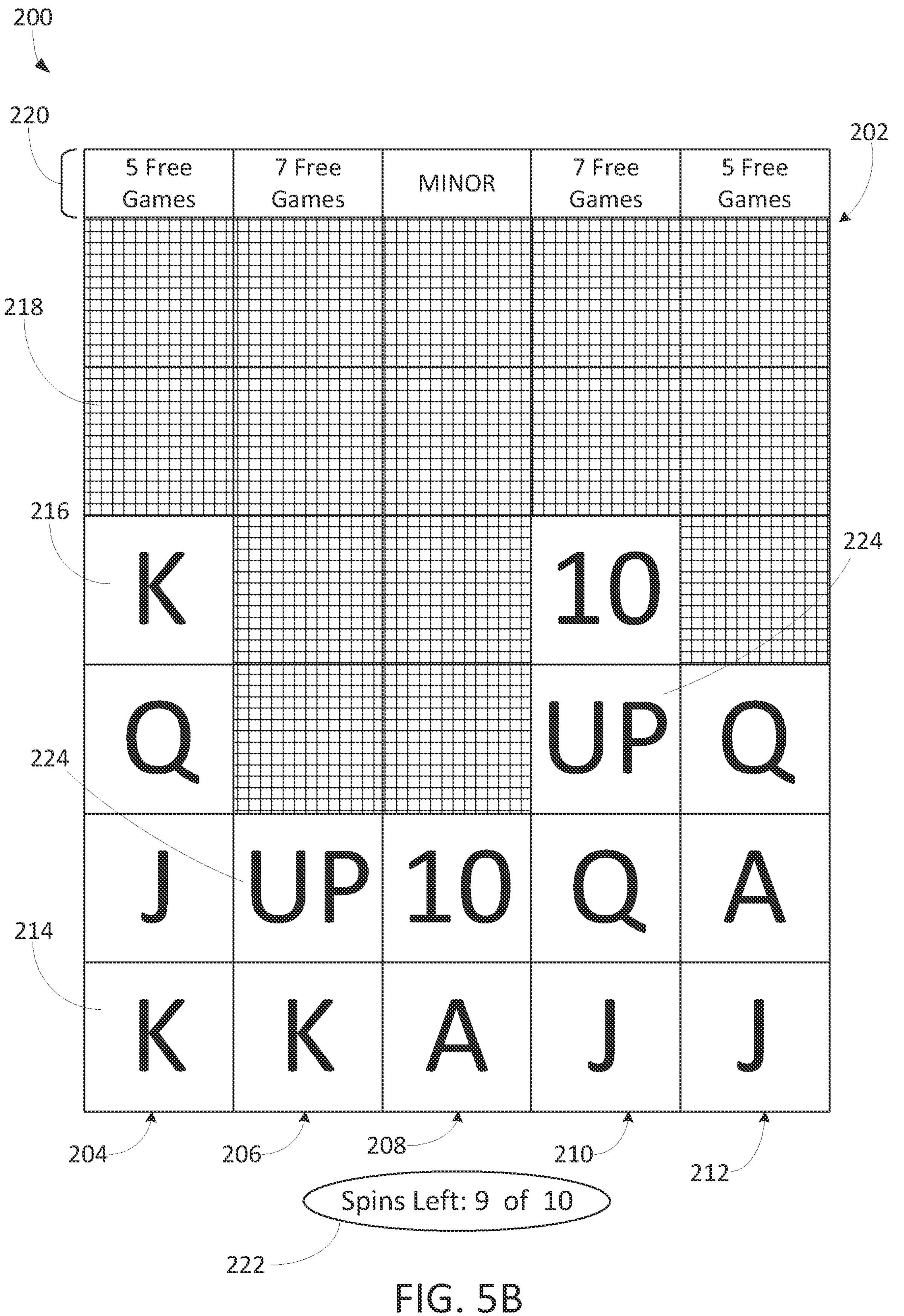
FIG. 5B is the game interface of FIG. 5A with the symbol array in a second state, according to one or more embodiments of the present disclosure.

FIG. 5B depicts the game interface 200 after a first game cycle outcome. In the first game cycle outcome, the active symbol positions of the symbol array 202 (i.e., the static symbol positions 214 and the allocated symbol positions 216) are occupied with randomly selected symbols. Populating the symbol positions may include the display device presenting animations and/or presentation elements to indicate the first game cycle outcome. The game cycle counter 222 is also decremented from ten to nine in response to the game cycle outcome.

In at least some embodiments, for each game cycle outcome, the game-logic circuitry determines winning outcomes based on the symbols populating the array 202. Each winning outcome is based on the number, location within the array 202, and/or type of symbols within the array 202. A respective award associated with each winning outcome is provided to the player through one or more award sequences. The award sequence is one or more animations and/or presentation elements provided by the display device (and/or other presentation elements of the gaming system, such as audio speakers and lighting assemblies) to indicate to the player that the corresponding award has been collected. The award sequence may include, for example, updating the credit balance of the player to include the award amount. Each award may have an individual award sequence, each game cycle outcome may have a single award sequence for one or more awards, each reset cycle (e.g., ten spins) may have an award sequence, and/or other suitable combinations of awards may be associated with an award sequence.

In addition to determining any winning outcomes, the game-logic circuitry is configured to detect any trigger events associated with dynamic changes to the symbol array 202. In the first game cycle outcome shown in FIG. 5B, two trigger symbols 224 occupy the array 202, thereby resulting in two trigger events. More specifically, the trigger symbols 224 include "UP" indicia and occupy the second and fourth columns 206, 210, respectively. As described above, the "UP" indicia reflect the resulting action associated with the trigger symbols 224, and the location of the trigger symbols 224 within the array 202 determines how the resulting action are applied to the array 202. In the illustrated example, the depicted trigger symbols 224 cause the corresponding columns to expand to include one additional symbol position towards an award position at the top of the column. In the example embodiment, each trigger symbol 224 is associated with a respective trigger event such that multiple trigger symbols 224 in one position subset causes the game-logic circuitry to detect a corresponding number of trigger events. In other embodiments, the trigger events require multiple trigger symbols 224, are not based on trigger symbols 224, and/or only one trigger event is detected per position subset or per the entire array 202 for each game cycle outcome.

In at least some embodiments, other trigger symbols 224 may have different indicia (sometimes referred to herein as "action indicia") to indicate other types of trigger symbols and resulting actions. For example, an "UP 2" trigger symbol 224 may result in two symbol positions being added to the position subset. An "UP LEFT" trigger symbol 224 may cause the column to the left of the position subset including the trigger symbol 224 to include an additional symbol position, where receiving such a trigger symbol 224 in the leftmost column causes the rightmost column to be expanded. In another example, "UP ALL" trigger symbols 224 cause all position subsets of the array 202 to expand by one position or all the way to the respective award positions as described herein.

It is to be understood that although the example embodiment includes trigger symbols with action indicia and actions resulting in upward expansion of the symbol array 202, at least some embodiments may include additional or alternative changes to the array 202. In some embodiments, trigger symbols 224 may cause one or more position subsets to decrease or remove symbol positions. In other embodiments, the trigger symbols 224 cause the rows of the array 202 to expand in addition to or in place of the columns 204-212. In certain embodiments, the trigger symbols 224 may add new position subsets, remove existing position subsets, and the like. Other suitable types of trigger symbols that modify the symbol array 202 to include or remove symbol positions not explicitly described above are contemplated as within the spirit and scope of the present disclosure.

In some embodiments, the trigger symbols 224 are not included in winning combinations. That is, no direct award is provided based on the presence of one or more trigger symbols 224 within the array 202. In one example, the trigger symbols 224 are removed from the array 202 reveal underlying symbols such that detecting winning outcomes includes the revealed symbols. Each trigger symbol 224 may be associated with a symbol prior to generating the game cycle outcome, or a symbol may be randomly selected to replace the trigger symbol 224 after the game cycle outcome is initially generated. For reel-based symbol population, the trigger symbol 224 may be "overlaid" on an existing symbol of the reel strip, or the trigger symbol 224 is included within the reel strip at a particular reel position. In another example, the trigger symbols 224 remain within the array 224, and winning outcome detection is based on the remaining symbols occupying the symbol positions of the array 202. In other embodiments, the trigger symbols 224 are included within one or more winning outcomes and/or are used for another aspect of the game feature, such as applying modifiers to other winning outcomes.

Figure 5C:
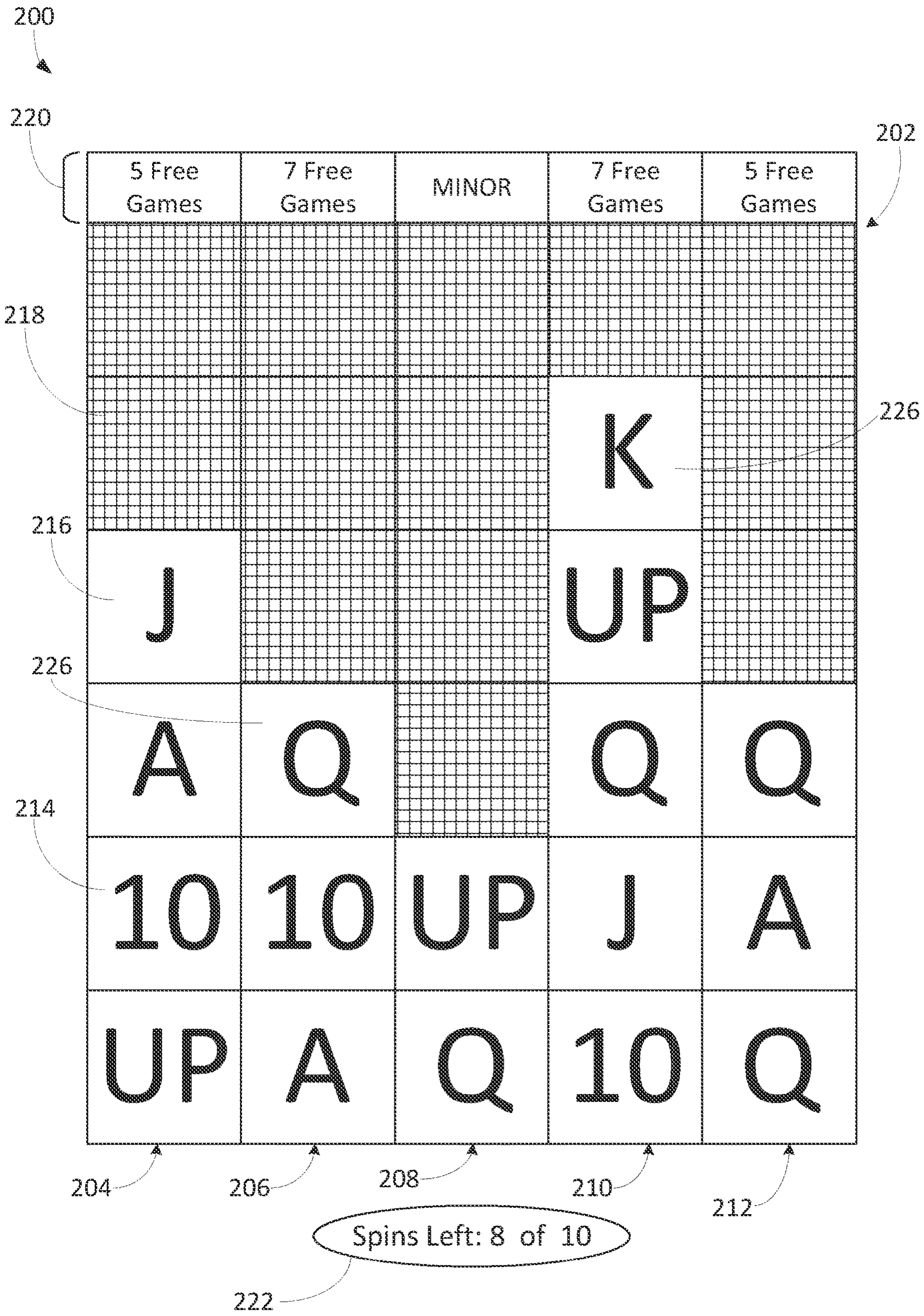
FIG. 5C is the game interface of FIG. 5A with the symbol array in a third state, according to one or more embodiments of the present disclosure.

FIG. 5C depicts the game interface at a second game cycle outcome following the outcome shown in FIG. 5B. The symbol array 202 has been altered based on the trigger symbols 224 from the first game outcome. More specifically, the second and fourth columns 206, 210 have been expanded to each include one expanded symbol position 226 above the respective static symbol positions 214 and allocated symbol positions 216. The expanded symbol positions 226 are any symbol positions added to the symbol array 202 beyond the static and allocated symbol positions 214, 216. In the example embodiment, the expanded symbol positions 226 are converted from inactive symbol positions 218 to be included within the active array 202. This conversion of the expanded symbol positions 226 may be visually indicated by changing the appearance of the expanded symbol positions 226 and/or populating the expanded symbol positions 226 with symbols during subsequent game cycle outcomes (particularly for embodiments in which inactive symbol positions are not populated with symbols or otherwise hidden from view). In at least some examples, the expanded symbol positions are converted to appear the same as the static and/or allocated symbol positions 214, 216. In some embodiments in which symbol positions may be removed from the array 202, the expanded symbol positions and/or other symbol positions of the active array may be converted back to inactive symbol positions 218 in response to one or more trigger events.

Progression towards the awards 220 can be measured by the state of the symbol positions of each position subset. In the example embodiment, progression is visually indicated by the height of each column 204-212 of the array 202. In the state shown in FIG. 5C, the fourth column 210, which is the closest position subset to a respective award 220, is one symbol position away from the corresponding award position 228. In the second game cycle outcome, another trigger symbol 224 occupies the fourth column 210, thereby causing the game-logic circuitry and the display device to add an expanded symbol position 226 to the fourth column 210.

Figure 5D:
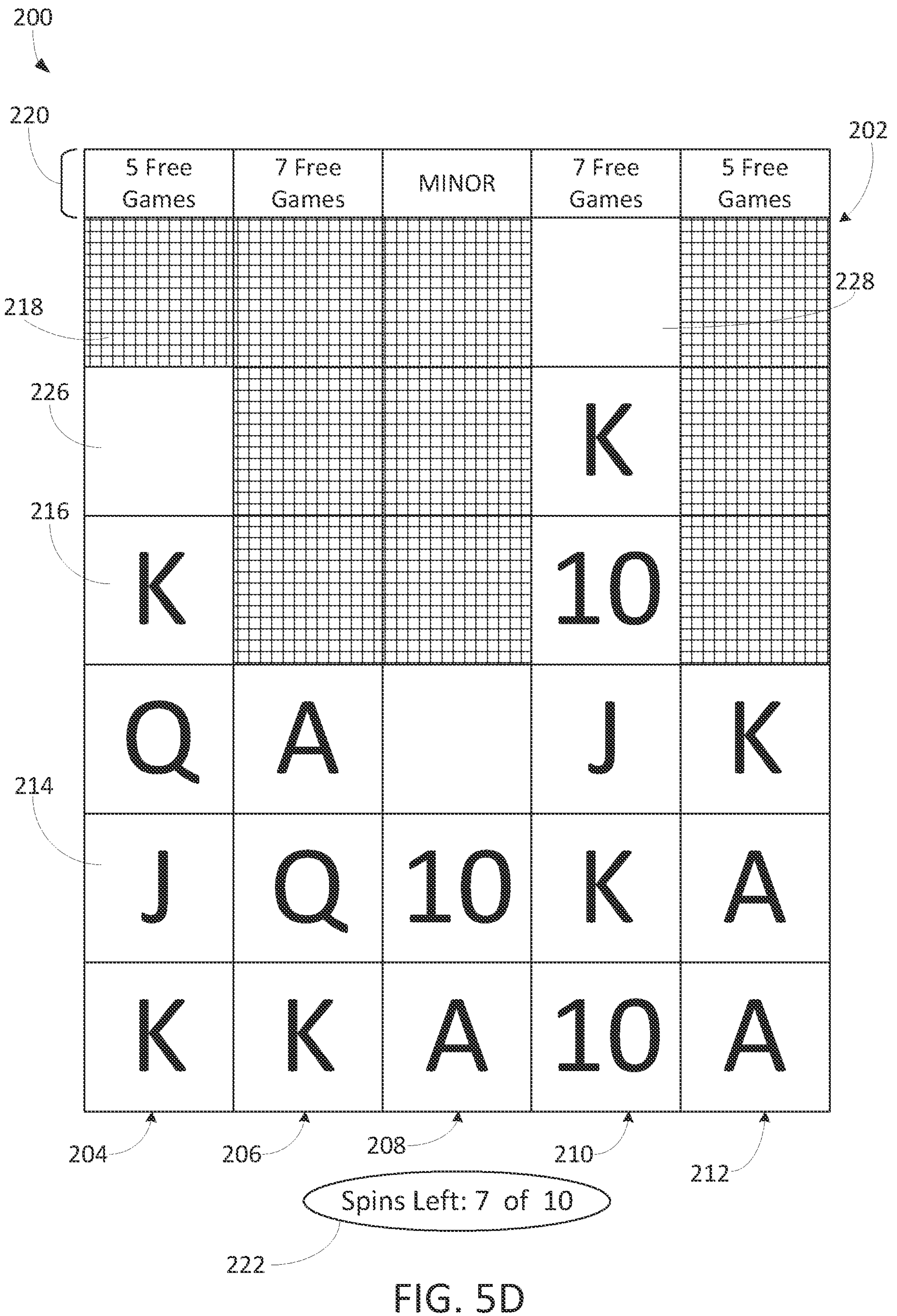
FIG. 5D is the game interface of FIG. 5A with the symbol array in a fourth state, according to one or more embodiments of the present disclosure.

FIG. 5D depicts the game interface 200 at a third game cycle outcome following the second game cycle outcome shown in FIG. 5C. As stated above, the fourth column 210 reached the corresponding award position 228, and the award 220 associated with the fourth column 210 is provided. In the example embodiment, the award is seven free games or spins within a bonus game feature. That is, reaching the award position 228 is a bonus trigger for initiating a bonus game feature, and the number of the games or spins within the bonus game feature is provided by the award 220. In other embodiments, other suitable awards may be provided in addition to or in place of the bonus game feature award, such as a credit award, jackpot award, free spins award (for the base game feature shown in FIG. 5D), and the like. The award is provided immediately in response to achieving the award trigger (i.e., reaching the award position), or the award may be delayed based on the game feature configuration. In one example, the award may be applied in response to resetting the symbol array 202, such as an award adding additional allocated symbol positions 216.

In the example embodiment, in response to triggering the bonus game feature, the game feature is suspended, and the bonus game feature is initiated. Suspending the game feature may include, for example, suspending the game cycle counter 222, locking the state of the symbol array 202 (i.e., no symbol positions added or removed), and/or the like such that concluding the bonus game feature causes the game feature to be resumed at the exact same state prior to suspension. In other embodiments, the bonus game feature may cause one or more changes that impact the underlying game feature of the interface 200. In one example, the trigger events are still active and available in the bonus game feature such that the symbol array 202 may include additional symbol positions through the bonus game feature. In some embodiments, the set of available trigger symbols (or other game elements associated with the trigger events) may be different within the bonus game feature.

Figure 5E:
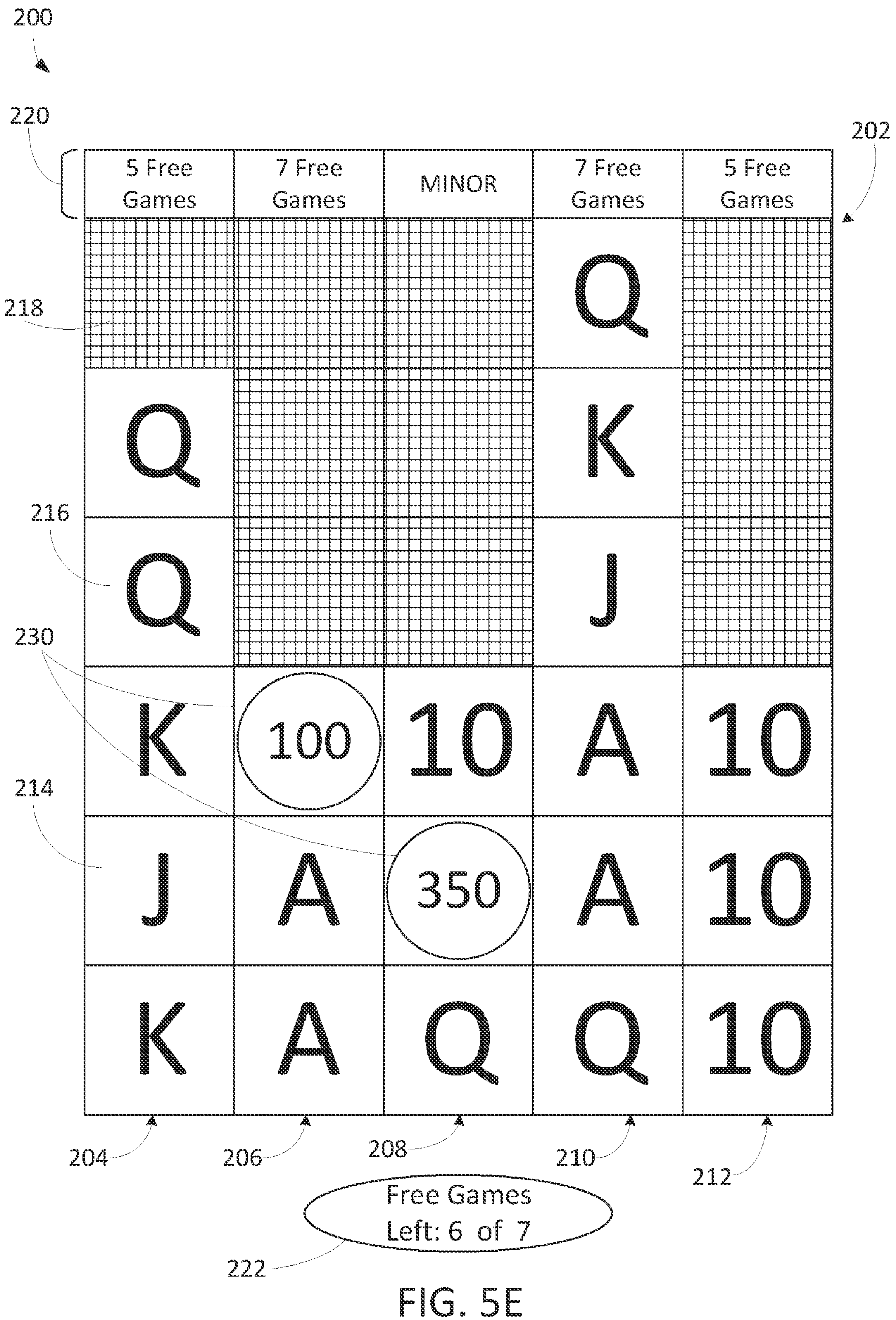
FIG. 5E is the game interface of FIG. 5A presenting a bonus game feature, according to one or more embodiments of the present disclosure.

FIG. 5E depicts the game interface at a first bonus game cycle outcome of the bonus game feature. In this example, the symbol array 202 is in the same state as the state triggering the bonus game feature. In other embodiments, the state of the array 202 may change. For example, the array 202 may be temporarily expanded to include all available symbol positions (i.e., all inactive symbol positions) for the bonus game feature.

In at least some embodiments, the bonus game feature is similar to the base game feature. That is, the symbol positions are populated with symbols randomly selected from a set of available symbols. The set of available symbols may be the same or different from the set of available symbols of the base game feature. In the example embodiment, the set of the available symbols for the bonus game feature includes one or more value-bearing symbols 230. The value-bearing symbols are symbols including award indicia that visibly indicate an award value associated with each value-bearing symbol. Populating a symbol position with a value-bearing symbol 230 (or detecting a winning outcome including the value-bearing symbol 230) causes the award value of the value-bearing symbol 230 to be provided in one or more award sequences. The award value associated with a particular value-bearing symbol 230 is predefined or selected from a set or range of predefined award values. In the example embodiment, the value-bearing symbol 230 has an award value of 100 credits. It is to be understood that the form and presentation of the value-bearing symbol 230 and the award indicia are for exemplary purposes only and are not intended to the limit the value-bearing symbols to the illustrated configuration.

For bonus game features with a new or dedicated set of available symbols, at least one value-bearing symbol is included. For bonus game features using the set of available symbols of the base game feature, the value-bearing symbols 230 are added to the symbols of the base game feature or replace one or more symbols. In certain embodiments, the value-bearing symbols 230 replace the trigger symbols 224. In such embodiments, the award values of each value-bearing symbol 230 may be based on the type of trigger symbol 224 replaced by the value-bearing symbol 230.

The game cycle counter 222 in FIG. 5E is updated to reflect the progression through the bonus game feature rather than the base game feature. In this illustrated embodiment, seven free games or bonus game cycle outcomes are provided. In certain embodiments, additional games may be awarded through the bonus game feature (e.g., a value-bearing symbol including award indicia for free games). After the number of games indicated by the game cycle counter 222 reaches a termination count (i.e., zero), the bonus game feature concludes, and the base game feature resumes.

Figure 5F:
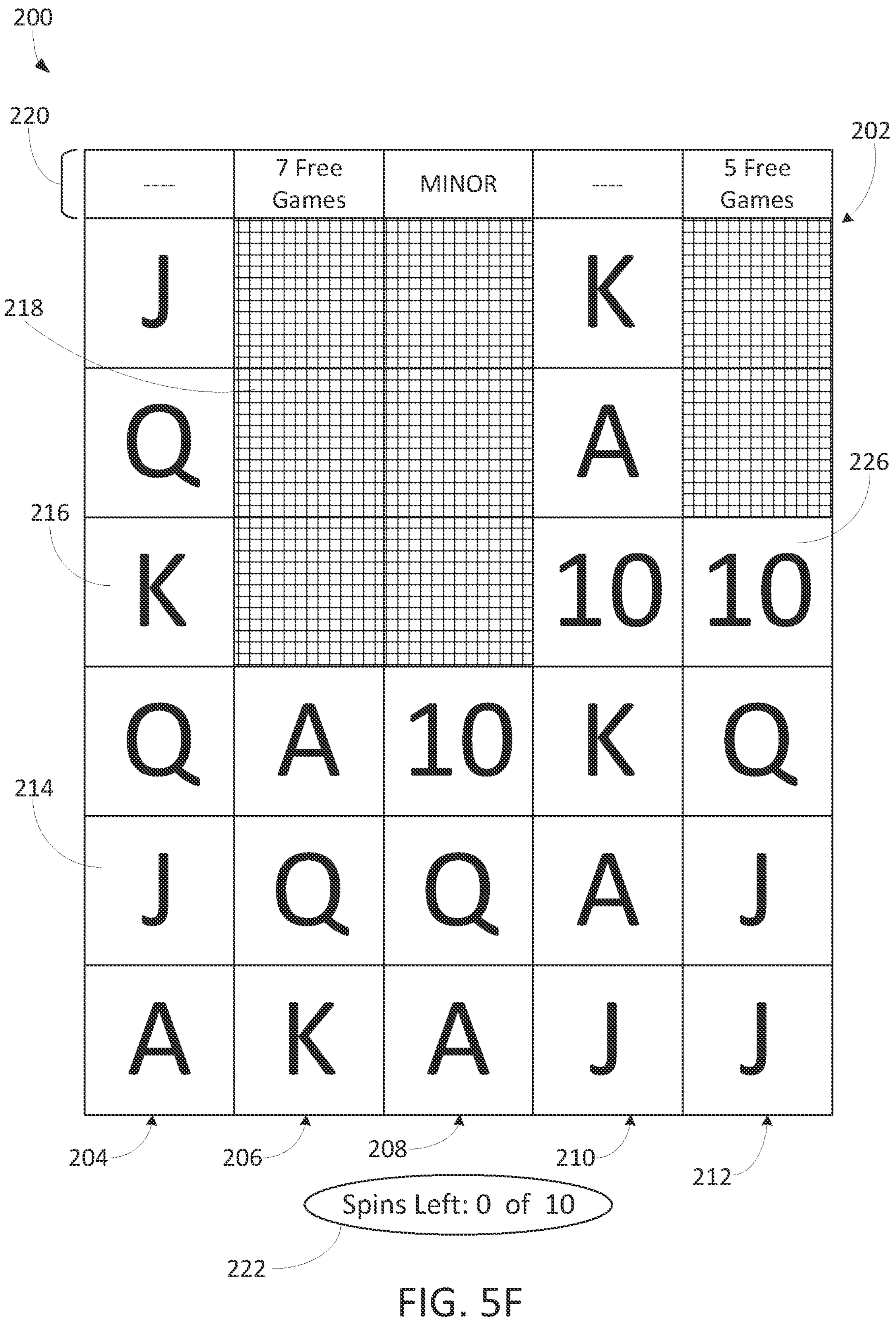
FIG. 5F is the game interface of FIG. 5A with the symbol array in a final state, according to one or more embodiments of the present disclosure.

FIG. 5F depicts the game interface 200 after several game cycle outcomes of the base game feature. In addition to changes to the array 202 from subsequent trigger events and bonus triggers, the awards 220 include two awards that have been removed from the interface 200. In the example embodiment, after an award is triggered, the award is removed to indicate that the award is not provided again. In other embodiments, the award may remain or be replaced by other awards. Similarly, the height of each column 204-212 may be limited to a fixed maximum number of positions such that any additional trigger symbols 224 within a fully expanded column does not further increase the height of the column. In certain embodiments, such trigger symbols 224 may be applied to other position subsets, converted into a modifier or multiplier, and/or the like. In one example, the trigger symbols 224 may be added to the shortest column, a random column, or the tallest column that has not reached maximum expansion.

The game interface 200 in FIG. 5F depicts a game cycle outcome associated with a reset condition. In the example embodiment, the reset condition is the game cycle counter 222 reaching a termination count reflecting expiration of the predetermined number of game cycle outcomes. In response to the reset condition, a reset sequence is provided by the display device to reset the symbol positions of the active array 202 to a second initial state. The state of the array 202 shown in FIG. 5F may be referred to herein as a "final state," where the final state is the state of the array 202 associated with a reset condition. The states shown in FIGS. 5B-5D may be referred to as "intermediate states" between an initial state and a final state.

In response to the reset condition, the game-logic circuitry is configured to reset the symbol positions from the final state to a new initial state. To transition from the final state, the game-logic circuitry causes the display device to remove any expanded positions 226 and/or allocated positions 216 from the symbol array 202, thereby leaving at least the static symbol positions 214. In the example embodiment, all expanded symbol positions 226 and allocated symbol positions 216 are removed by converting into inactive symbol positions 218. In other embodiments, resetting the symbol array 202 may use a different suitable configuration of removing symbol positions from the array 202, such as removal of only expanded symbol positions 226 or expanded symbol positions 226 and a portion of the allocated symbol positions 216.

The game-logic circuitry further is configured to allocate a second set of allocated symbol positions 216 to the symbol array 202 to reset the symbol array 202. The second set of allocated symbol positions 216 may be the same or different as the first set of allocated symbol positions 216 shown in FIG. 5A. That is, the number of symbol positions within the second set may be the same or different as the first set, and the allocation of the symbol positions 216 may result in the same configuration as the first set or at least partially different based on one or more random determinations (e.g., randomly generated numbers) and/or parameters associated with the game feature.

The removal of symbol positions and allocation of the second set of allocated symbol positions 216 is presented through one or more animations by the display device to convey the changes to the player. In at least some embodiments, rather than removing the symbol positions of the final state prior to allocation of the second set, the allocation of the second set may occur before or during the removal of the symbol positions of the final state. In such embodiments, the removal of symbol positions may appear to be limited to symbol positions outside of the static symbol positions 214 and the second set of allocated symbol positions 216. That is, symbol positions identified as part of the second set may appear to remain while other allocated symbol positions 216 and expanded positions 226 not overlapping the second set are removed.

Figure 5G:
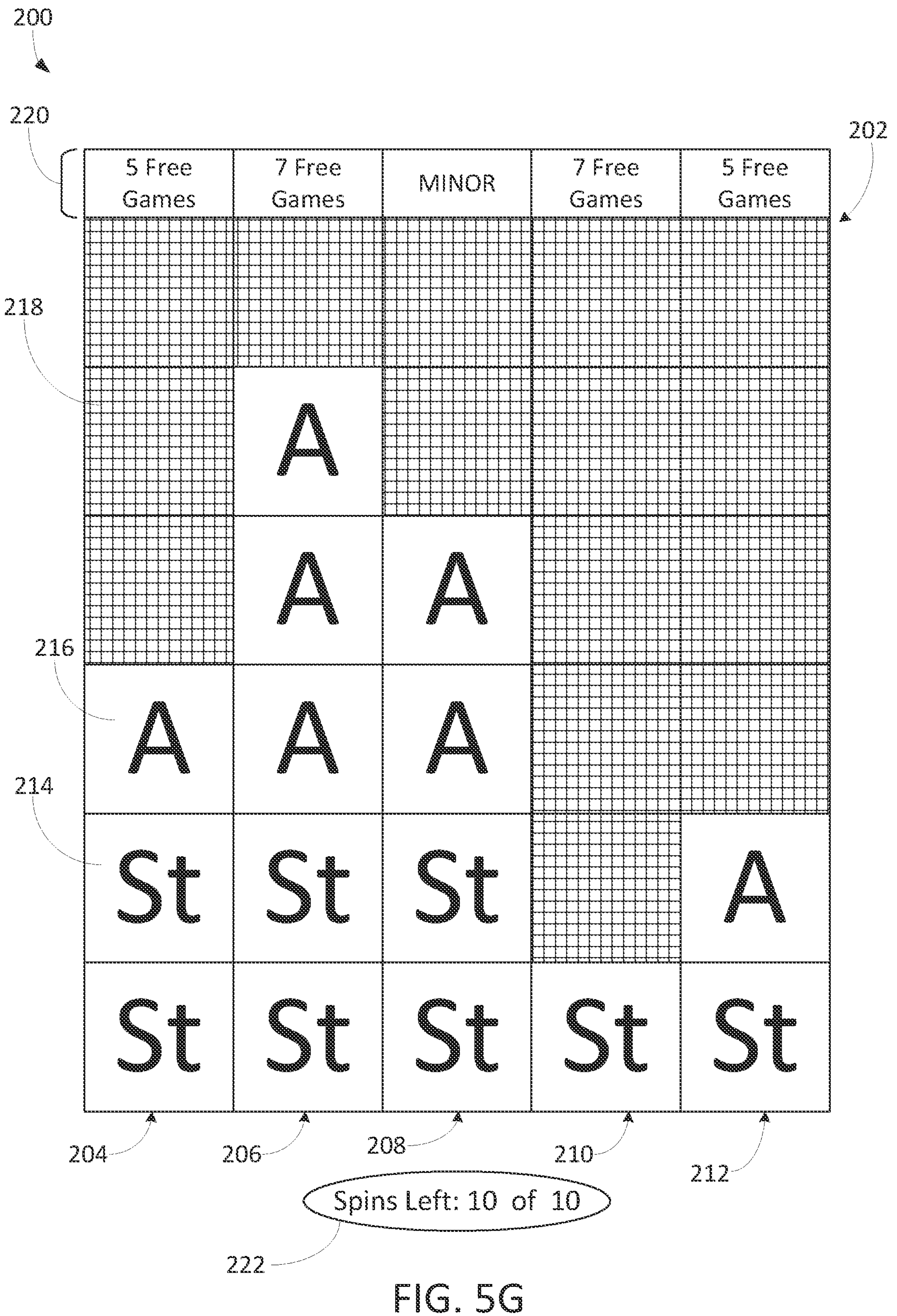
FIG. 5G is the game interface of FIG. 5A with the symbol array in a second initial state, according to one or more embodiments of the present disclosure.

FIG. 5G depicts the game interface 200 with the symbol array 202 in a second initial state. In this example, the second initial state includes a different configuration of allocated symbol positions 216 from the first initial state, and the static symbol positions 214 remain within the array 202. More specifically, the second set of allocated symbol positions 216 includes one position in the first column 204, three positions in the second column 206, two positions in the third column 208, zero positions in the fourth column 210, and one position in the fifth column 212. In other examples of the array 202 resetting, the random allocation may include a different configuration of the allocated symbol positions 216, including the same as the first initial state shown in FIG. 5A or with a different amount of allocated symbol positions 216.

In addition to the changes to the symbol array 202, the awards 220 have been reset such that the player can receive previously-provided awards again following the second initial state. In some embodiments, the awards 220 are the same between each initial states. In other embodiments, the awards 220 may vary in value and/or configuration (e.g., the minor jackpot award and bonus game awards may be reorganized between the position subsets). The game cycle counter 222 is also reset to indicate a new set or number of game cycle outcomes allotted to the player before another reset condition is met. In the example embodiment, the game cycle counter 222 is reset to the same predetermined number of outcomes (ten) each time the symbol array 202 is reset to an initial state. In other embodiments, the number of allotted outcomes may be different between initial states. In one example, meeting certain play time thresholds and/or wager thresholds may increase the number of allocated game cycle outcomes to the player at the next initial state.

Play of the game feature may then continue with the symbol positions of the array 202 progressing from the second initial state through intermediate states up to a second final state associated with another reset condition. In response to the reset condition, the symbol positions are reset to a third initial state and play of the game feature may continue within this progression loop until a termination condition is met. The termination conditions include, for example, a player initiating a payout sequence (i.e., the credit balance of the player is provided to the player via physical items like tickets or coins, or the credit balance is applied to an account associated with the player), the credit balance reaching zero, and/or other suitable conditions that would conclude the game feature. In one example, the game feature is not a base game feature, but rather is a bonus game feature that is triggered through play of the base game feature. In such embodiments, the reset condition may be the termination condition, and the subsequent initial state is generated and presented in response to triggering the bonus game feature.

Although the embodiments described above include the allocation of symbol positions and static symbol positions to reset the symbol array, some embodiments may use other means to randomly generate the dynamic configuration of the symbol array at an initial state. In some examples, the game-logic circuitry stores a set of available symbol position configurations for initial states and randomly selects one configuration from the set for each initial state. In such embodiments, rather than maintaining static symbol positions and allocating only allocated symbol positions, the entire configuration of the array is defined by the selection.

Figure 6:
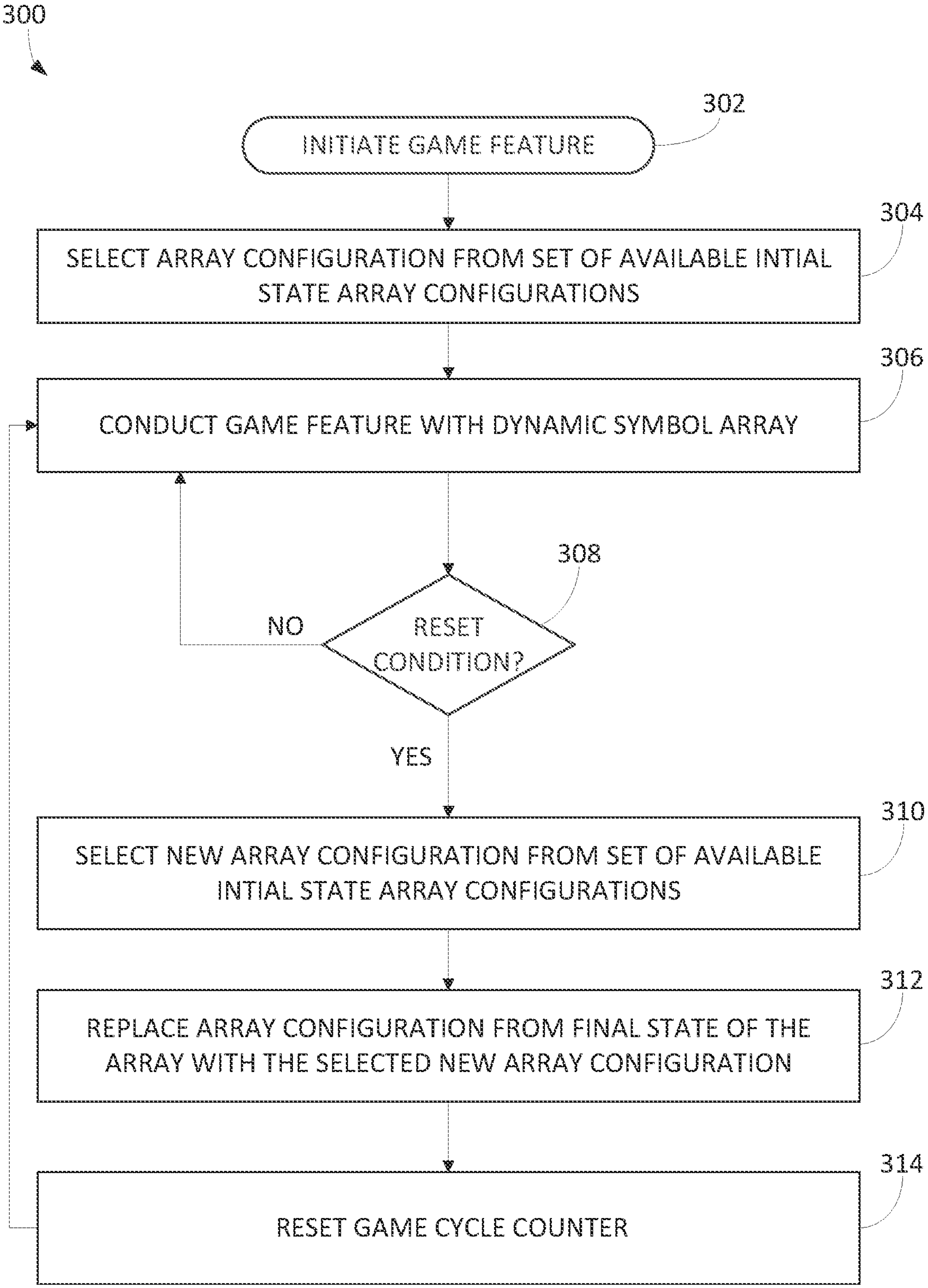
FIG. 6 is a flow diagram of an example method for resetting the array configuration of an example symbol array using a gaming system, according to one or more embodiments of the present disclosure.

FIG. 6 is a flow diagram of an example method 300 for providing a dynamic symbol array using a gaming system, such as the system shown in FIGS. 1 and 2. The method 300 is at least partially performed by game-logic circuitry and one or more display devices of a gaming machine in communication with the game-logic circuitry. The game feature associated with the method 300 may be at least partially similar to the game features described in FIGS. 3-4G unless otherwise noted herein. In other embodiments, the method 300 includes additional, fewer, or alternative steps performed by the game-logic circuitry, the display device, and/or another suitable device, including those steps and devices described elsewhere herein.

At step 302, the game-logic circuitry initiates the game feature. The game feature is a base game feature or default game feature that initiates in response to establishing a gaming session. In other embodiments, the game feature is a bonus game feature, and initiating the game feature is in response to detecting a bonus trigger in one or more other game features, such as a base game feature like the feature shown in FIG. 3.

In response to initiating the game feature, the game-logic circuitry causes the display device to present a symbol array in an initial state. More specifically, at step 304, the game-logic circuitry selects an array configuration (i.e., the number and/or arrangement of symbol positions within the active array) from a plurality of available initial array configurations. The initial array configurations indicate the number of symbol positions within the array and/or the distribution of the symbol positions between the different position subsets. Each initial array state configuration may be stored in a data structure that enables the game-logic circuitry and the display device to generate and present a corresponding array configuration. In one example, the data structure indicates the number of symbol positions within each position subset.

In some embodiments, the selection of an array configuration is at least partially random. That is, one or more random determinations by the game-logic circuitry are used to perform the selection. In certain embodiments, the selection may be at least partially based on non-random parameters, such as game history, wager history, player history, player input and/or the like. The selection process may be the same for each selection of an array configuration described herein, or the selection process may be altered between two selections. In one example, the set of available initial array configurations at step 304 is different from the set of available initial array configurations for subsequent selections. In other embodiments, the array configuration at step 304 is predefined.

At step 306, the game-logic circuitry conducts the game feature with the dynamic symbol array similar to the method 100 shown in FIG. 4. More specifically, the game-logic circuitry generates game cycle outcomes and, based on trigger events detected within the game cycle outcomes, causes the display device to add or remove symbol positions from the symbol array. Play of the game feature continues until, at step 308, a reset condition is detected. In the example embodiment, the reset condition is expiration of a predetermined number of game cycle outcomes. If no reset condition is detected, the play of the game feature continues at step 306.

If the reset condition is detected, the symbol positions of the symbol array are reset through steps 310 and 312. More specifically, the game-logic circuitry selects a new array configuration from the set of available initial state array configurations and replaces the array configuration from the final state of the array associated with the reset condition with the selected array configuration. In some embodiments, the set of available initial state array configurations is different from the previous set at step 304. The selection may be at least partially random and/or based on parameters similar to the selection at step 304. Replacing the array configuration of the final state with the selected array configuration effectively removes the symbol positions of the final state and adds the symbol positions of the selected array configuration. The removal and replacing process may be visually indicated separately or as one combined action. That is, common symbol positions between the final state and the new initial state are retained, symbol positions only in the final state are removed, and symbol positions only in the new initial state are added by the display device.

Through steps 310 and 312, the new array configuration may be the same or different as the array configuration selected at step 304. In certain embodiments, the game-logic circuitry may remove one or more previously selected array configurations from the set of available array configurations to vary the initial state of the array.

In addition to the changes to the array, the game-logic circuitry causes the display device to reset the game cycle counter at step 314 and/or other game elements of the game feature, such as the awards. Following steps 310-314, play of the game feature continues at step 306 until a subsequent reset condition is detected.

In at least some embodiments, one or more additional bonus game features may be provided with the foregoing game features. In one example, a bonus game feature is triggered in response to one or more bonus trigger symbols populating the symbol array. The bonus game feature includes value-bearing symbols and award indicators, where the award value presented by the award indicators is applied to the value-bearing symbols populating the symbol positions associated with the award indicators.

Figure 7:
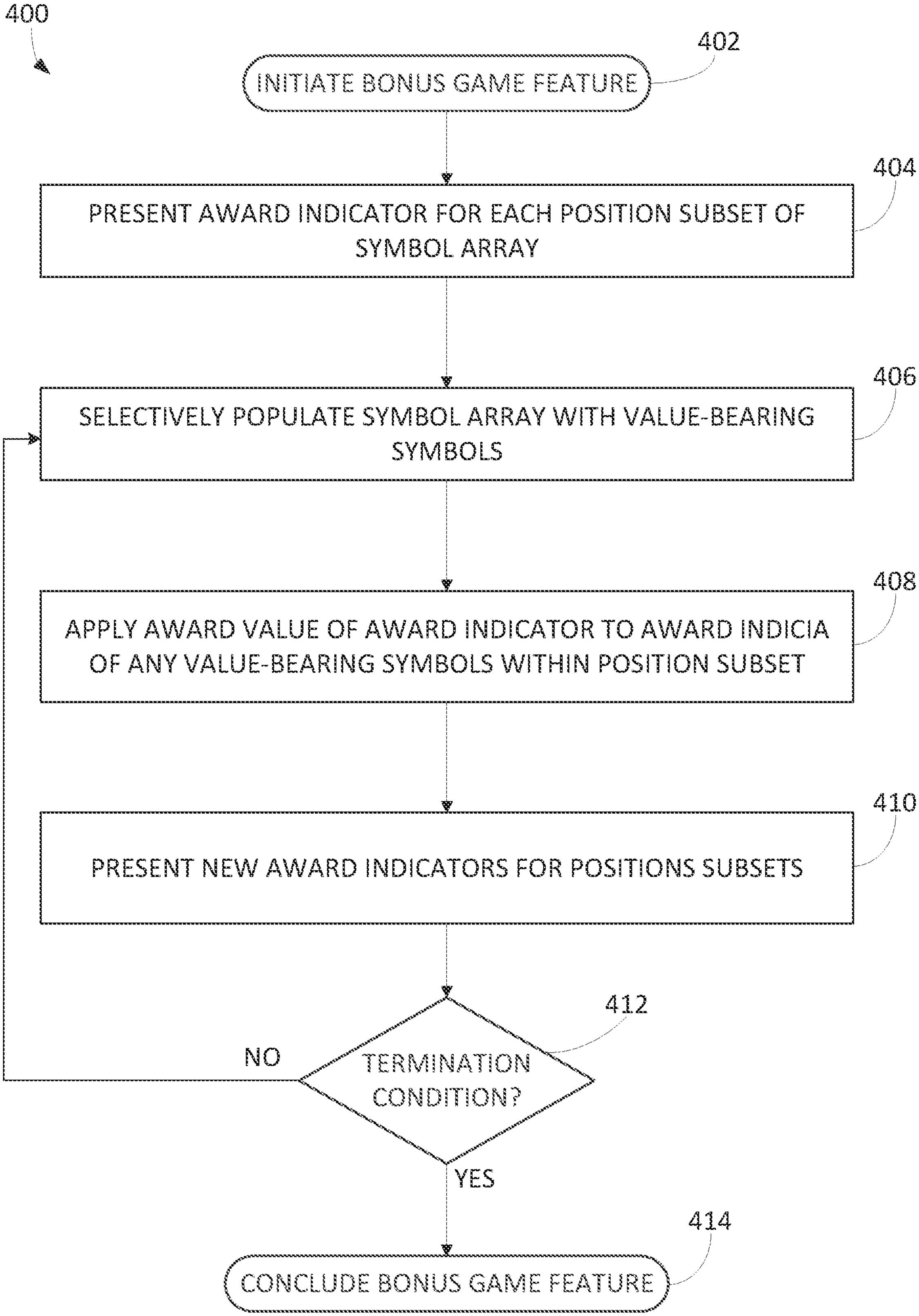
FIG. 7 is a flow diagram of an example method for a bonus game feature with value-bearing symbols and award indicators using a gaming system, according to one or more embodiments of the present disclosure.

FIG. 7 is a flow diagram of an example method 400 for conducting and presenting a bonus game feature using a gaming system, such as the system shown in FIGS. 1 and 2. The bonus game feature may be used in combination with a base game feature such as the features shown in FIGS. 3 and 5A-5G. The method 400 is at least partially performed using game-logic circuitry and one or more display devices of a gaming machine. In other embodiments, the method 400 includes additional, fewer, or alternative steps performed by the game-logic circuitry and/or other suitable devices, including those steps and devices described elsewhere herein.

At step 402, the bonus game feature is initiated. In the example embodiment, the bonus game feature is initiated in response to a bonus trigger event in a base game feature. The bonus trigger event may include, for example, detecting a predetermined number of bonus trigger symbols within a game cycle outcome. The bonus game feature is initiated with a predetermined number of game cycle outcomes allocated, or the bonus game feature may be dynamic to enable the duration of the bonus game feature to be increased or decreased in response to the bonus trigger event and/or play of the bonus game feature.

In some embodiments, the state of the array is the same as the base game feature. In other embodiments, the state of the array may be changed for the bonus game feature. In one example, all available symbol positions are included in the symbol array for the bonus game feature. In certain embodiments, changes to the symbol array in the bonus game feature is carried through to the base game feature. In other embodiments, the state of the symbol array at the bonus trigger event is preserved or saved such that returning to the base game feature also returns the symbol array to the preserved state.

At step 404, the display device presents the symbol array and a plurality of award indicators. The award indicators include indicia for visually indicating an award value for use as described herein. The award value may be a credit value, a jackpot award, and/or other non-credit awards (e.g., free spins, bonus symbols, etc.). In certain embodiments, the award indicators are multipliers or modifiers that affect other award values as described herein. In the example embodiment, each award indicator is associated with a respective position subset. In some embodiments, the position subsets of the bonus game feature are the same as the position subsets of the base game feature, such as the columns and/or rows of symbol array. In other embodiments, the position subsets of the bonus game feature are different from the position subsets of the base game feature. In one example, each award indicator is presented with a color or other unique visual indicator, and the symbol positions of the corresponding position subset include the same visual indicator. In certain embodiments, at least one award indicator is associated with a plurality of position subsets, and/or at least one position subset is associated with a plurality of award indicators.

At step 406, the game-logic circuitry causes the display device to selectively populate the symbol array with symbols, which may include value-bearing symbols. "Selective population" in this context refers to the population of symbol positions with blanks or inactive symbols that are visually distinguished from active symbols that impact the outcomes of the bonus game feature. In some embodiments, the value-bearing symbols are the only active symbols that populate the array. Some outcomes of the bonus game feature may include no active symbols. The population of the symbol may be based on one or more random determinations by the game-logic circuitry. In one example, the game-logic circuitry generates one or more random numbers to select symbols from a weighted table of symbols for the bonus game feature.

At step 408, for any value-bearing symbols populating the symbol array, the award indicia of the value-bearing symbol is linked to the award value of the award indicator associated with the position subset include the value-bearing symbol. That is, the award indicia of a value-bearing symbol is equal to or based on the award indicia of the award indicator. In some embodiments, the award indicia of the value-bearing symbol is revealed at the presentation of the game cycle outcome. In other embodiments, the award indicia of the value-bearing symbol is updated prior to or during the animation for populating the symbol array (e.g., a spinning animation).

In the example embodiment, the award value of each award indicator is provided for each value-bearing symbol within the corresponding position subset. In other embodiments, the award value of the value-bearing symbol is at least partially a function of the award value of the associated award indicator. In one example, the award value of the value-bearing symbol is decremented from the award value of the award indicator. In another example, the value-bearing symbols include multipliers, where the award value of each value-bearing symbol is a function of the multiplier and the award value of the award indicator. In a further example in which the award indicators include multipliers, the award value of the value-bearing symbols are modified at least partially as a function of the multiplier of the award indicator.

At step 410, the game-logic circuitry causes the display device to present new award indicators. In one example, the existing award indicators are rearranged to associate with different position subsets. In another example, at least one new award indicator is provided in addition to or in place of rearranging the award indicators. In a further example, any award indicators associated with value-bearing symbols in the game cycle outcome of step 408 are replaced. Other suitable means of providing dynamic awards in the bonus game feature via the award indicators are contemplated. The new award indicators are selected from one or more sets of available award indicators and/or a range of available award values. In certain embodiments, at least one award indicator may be replaced with an award indicator having an award value of zero such that no award value is provided for value-bearing symbols associated with the award indicator of zero. In other embodiments, the award indicators remain fixed through the bonus game feature such that the method 400 does not include step 410.

At step 412, the game-logic circuitry determines whether a termination condition is present. In the example embodiment, the termination condition is expiration of the game cycle outcomes allotted for the bonus game feature. In some embodiments, the length of the bonus game feature is predefined. In other embodiments, the bonus game feature has a dynamic game length based on events and conditions within the bonus game feature. In one example, the symbol array is selectively populated with termination symbols, where collecting one or more termination symbols is the termination condition. In another example, one or more additional game cycle outcomes is provided in response to a symbol or combination of symbols in the bonus game feature. In certain embodiments, multiple termination conditions may be associated with the bonus game feature.

If no termination condition is detected, the bonus game feature continues at step 406 for at least one subsequent game cycle outcome until the termination condition is met. If a termination condition is detected, the bonus game feature concludes at step 414. Concluding the bonus game feature may cause another game feature (e.g., a base game feature) to resume or initiate. In certain embodiments, concluding the bonus game feature may cause the gaming session to conclude. In other embodiments, the game feature may be a base game feature, and the termination condition is similar to the termination conditions of the base game features described herein. In such embodiments, the game cycle counter may be used to reset or alter at least one aspect of the game feature, or the game cycle counter may not be included in the game feature.

Figure 8A:
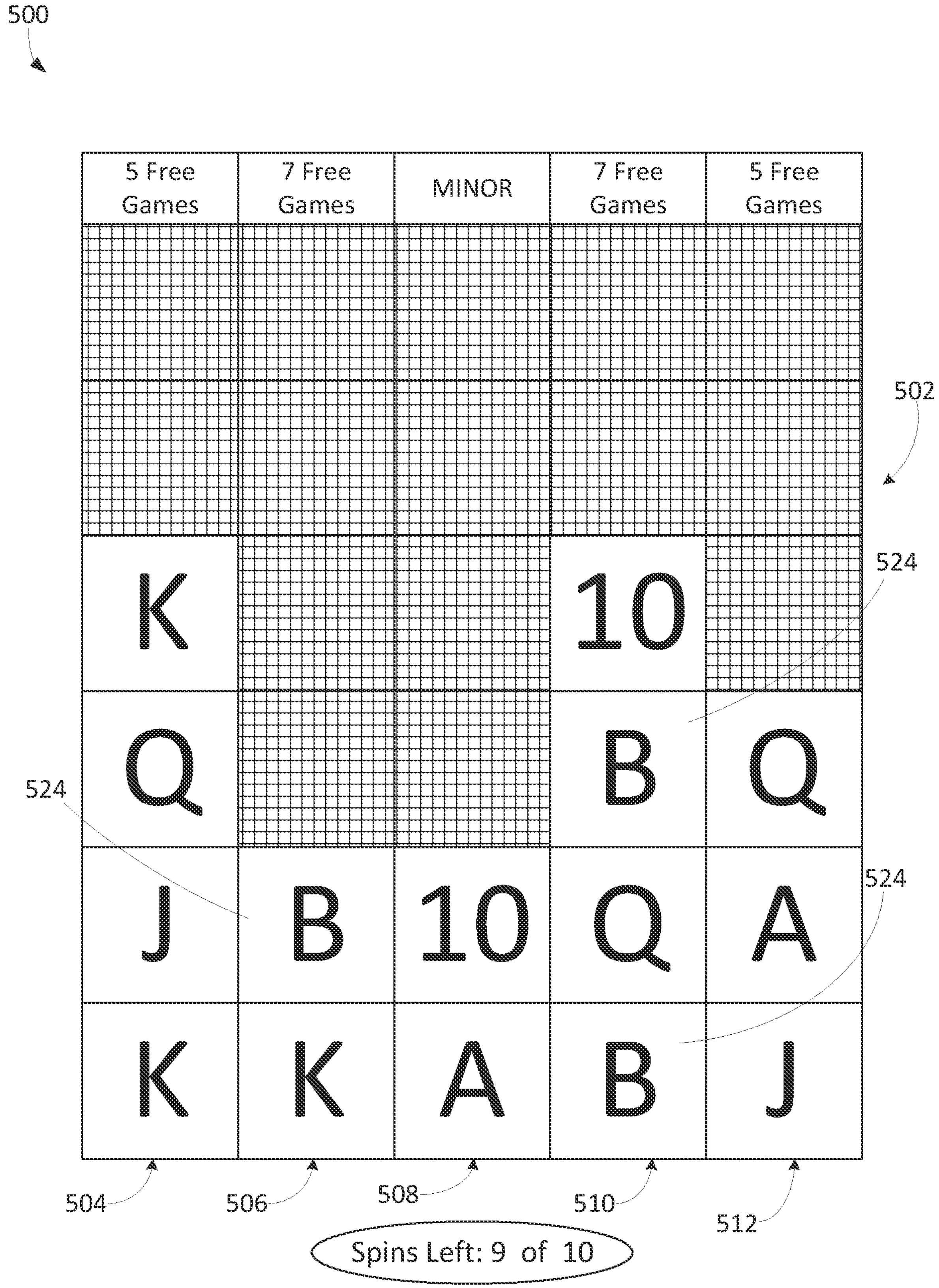
FIG. 8A is an example game interface of a gaming system at a bonus trigger state of a base game feature, according to one or more embodiments of the present disclosure.
Figure 8B:
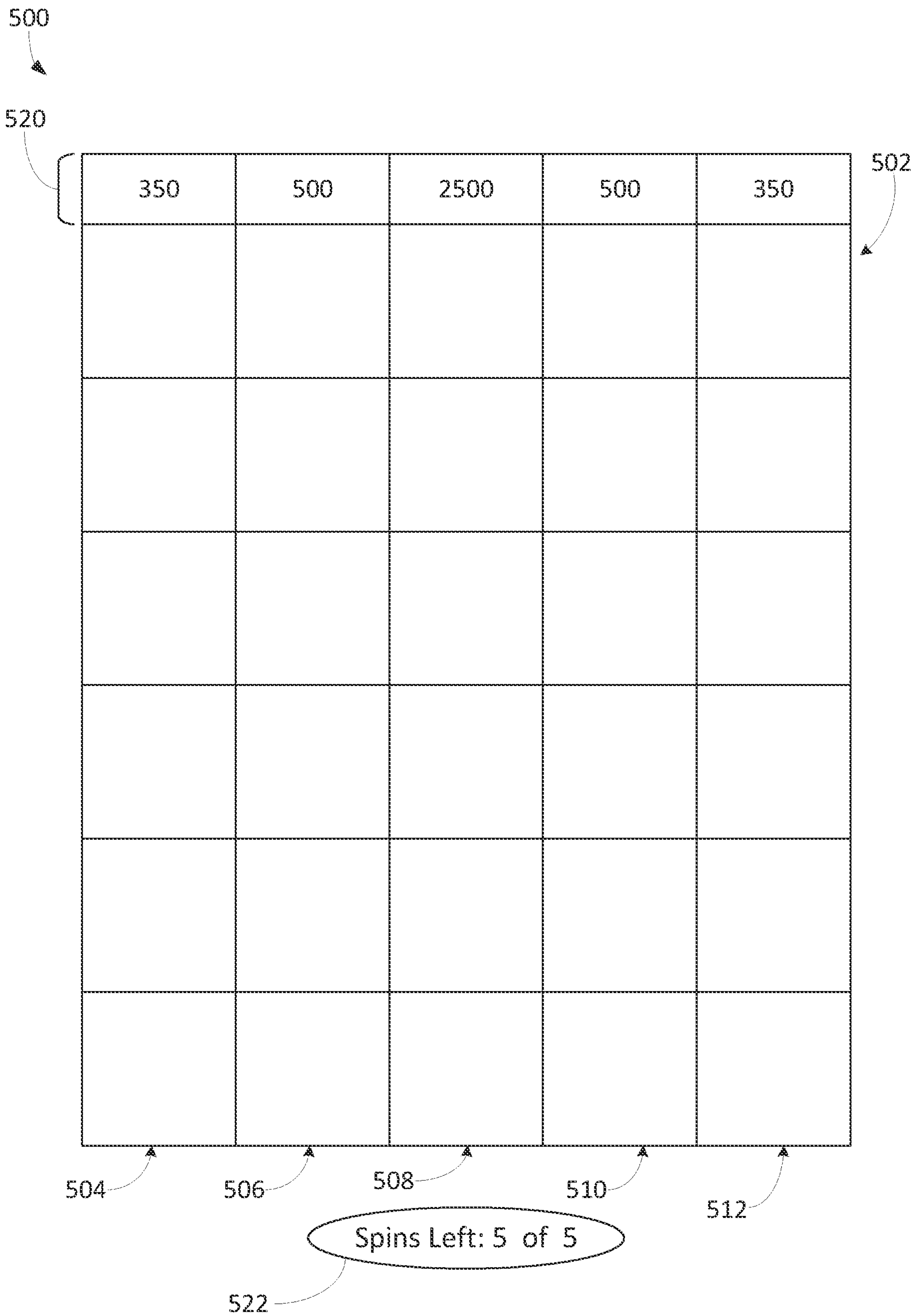
FIG. 8B is the game interface of FIG. 8A at an initial bonus game state, according to one or more embodiments of the present disclosure.
Figure 8C:
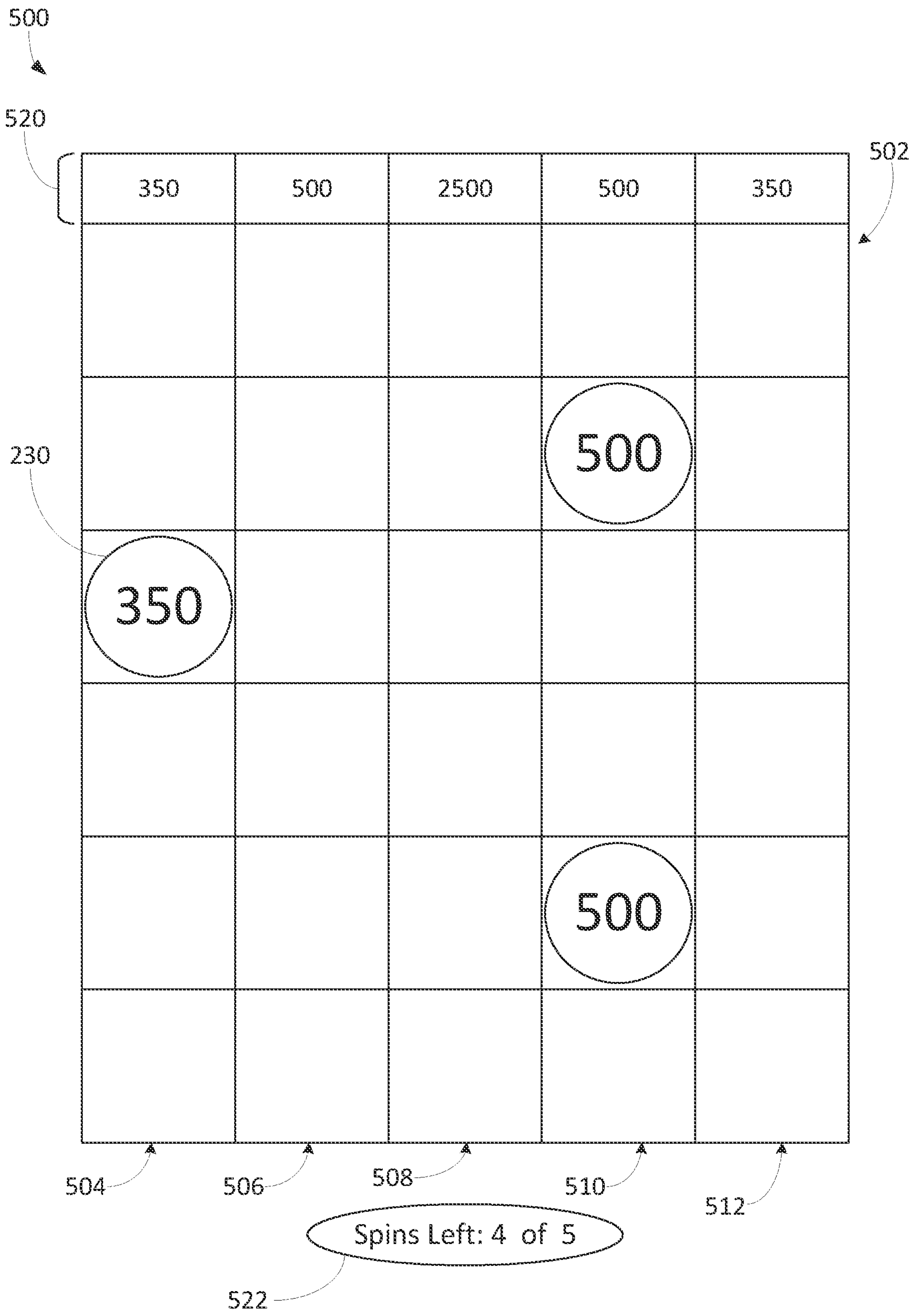
FIG. 8C is the game interface of FIG. 8A at a second bonus game state, according to one or more embodiments of the present disclosure.
Figure 8D:
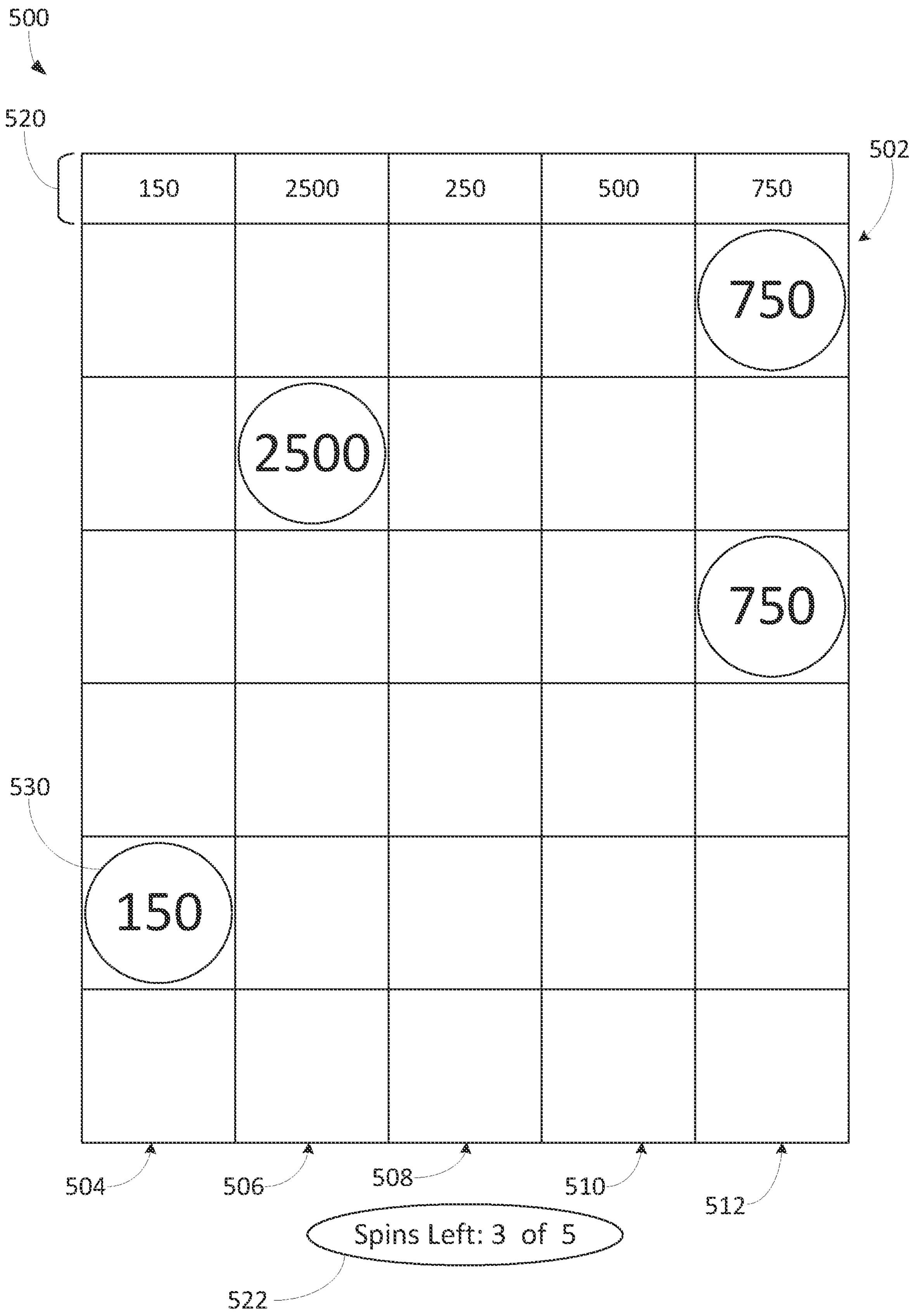
FIG. 8D is the game interface of FIG. 8A at a third bonus game state, according to one or more embodiments of the present disclosure.

FIGS. 8A-8D depict an example game interface 500 for a bonus game feature provided by a gaming system, such as the system shown in FIGS. 1 and 2. FIG. 8A depicts the game interface 500 at a bonus trigger state in a base game feature, FIG. 8B depicts the game interface 500 at an initial bonus game state, FIG. 8C depicts the game interface 500 in a second bonus game state, and FIG. 8D depicts the game interface 500 in a third bonus game state. The game interface 500 includes a symbol array 502 with a plurality of columns 504, 506, 508, 510, and 512. The game interface 500 includes additional, fewer, or alternative presentation and game elements, including those described elsewhere herein.

With respect to FIG. 8A, the game interface 500 is presented in an example trigger state in a base game feature. The base game feature may be, for example, similar to the feature shown in FIGS. 5A-5G. The trigger state includes a bonus trigger event that causes the bonus game feature to be initiated. In the example embodiment, the trigger event is the presence of three or more bonus trigger symbols 524 within the symbol array 502. In other embodiments, the bonus trigger event may include additional or alternative events and/or conditions (e.g., a different number of bonus trigger symbols 524). In some embodiments, the bonus trigger symbols 524 are dedicated to triggering the bonus game feature. In other embodiments, the bonus trigger symbols 524 may include other functionality within the base game feature. In one example, the bonus trigger symbols 524 are modified trigger symbols (e.g., trigger symbols 224, shown in FIG. 5B) used for trigger events of the base game feature.

In response to the bonus trigger event, the state of the game interface 500 in the base game feature is saved, suspended, or otherwise preserved for play following conclusion of the bonus game feature. In other embodiments, initiating the bonus game feature causes the base game feature to be reset or reinitiated following the conclusion of the bonus game feature. In addition to preserving the base game feature, the game interface 500 is updated by the display device to present the bonus game feature.

With respect now to the initial state of the bonus game feature shown in FIG. 8B, the symbol array 502 has been expanded to include all available symbol positions, and the game interface 500 includes a plurality of award indicators 520 and a game cycle counter 522 associated with the bonus game feature. In other embodiments, the game interface 500 includes additional or alternative presentation elements and/or provides the presentation in another suitable configuration. In one example, the array 502 may remain the same as the base game feature or at least include less than all of the available symbol positions.

Unlike the awards from the base game feature, the award indicators 520 in the example embodiment are converted into credit awards, where the presented value represented a credit award available to collect as described herein. In other embodiments, the award indicators 520 may be associated with non-credit awards or awards combining credit awards with non-credit awards. As described herein, the award indicators 520 are dynamic such that the corresponding award values are reorganized, replaced, and/or otherwise changed between game cycle outcomes of the bonus game feature. At the initial bonus state, the award indicators 520 may be predefined or selected in response to initiating the bonus game feature. The selection of the award indicators 520 may be at least partially random and/or based on one or more conditions or parameters, such as the current game cycle counter.

The game cycle counter 522 is similar to other game cycle counters described herein and provides a visual indication of the duration of the bonus game feature to the player. In the illustrated example, the length of the bonus game feature is five spins or game cycle outcomes. In other embodiments, the length of the bonus game feature may be a different suitable number of game cycle outcomes or include an alternative measure of game length. For example, collecting a certain number of termination symbols within the bonus game feature concludes the bonus game feature, or failing to collect a predetermined number of symbols ends the bonus game feature. The length of the bonus game feature may be predetermined or dynamic. In one example, the length of the bonus game feature is based on the bonus trigger event, such as the number of bonus trigger symbols 524 included in the bonus trigger event.

With reference to FIG. 8C, the second bonus game state is following a game cycle outcome from the initial bonus game state. For each game cycle outcome, the display device selectively populates the symbol positions of the symbol array 502 with symbols and/or blanks. The symbols include at least value-bearing symbols 530. In some embodiments, other types of symbols are included, such as modifiers, multipliers, and/or inactive symbols (i.e., symbols that are presented but do not affect the outcome of the bonus game feature). In other embodiments, the symbol array 502 is selectively populated with blanks and value-bearing symbols 530.

In the example embodiment, the value-bearing symbols 530 include award indicia and a corresponding award value based on the award value of the award indicator associated with symbol position or position subset occupied by each value-bearing symbol 530. In the illustrated example, the leftmost value-bearing symbol 530 in the first column 504 inherits an award value of '350' from the award indicator 520 associated with the first column 504. The two rightmost value-bearing symbols 530 each inherit award values of '500' from the award indicator 520 of the fourth column 510. In this embodiment, each value-bearing symbol 530 matches the award value of the corresponding award indicator 520. In other embodiments, the award values of the value-bearing symbols 530 are at least partially a function of the award values of the award indicators. In one example, the value-bearing symbols 530 decrement the award value of the corresponding award indictors 520 until no award value is left. In another example, the value-bearing symbols 530 are associated with multipliers, and the award value of the award indicators 520 is multiplied by the associated multiplier for each value-bearing symbol 530.

The display device is configured to present one or more animations for the game cycle outcome. In one example, for a reel-based game, the reels are animated to spin and stop to present the game cycle outcome. In addition to presenting animations for populating the symbol array, the display device may present animations for an award sequence associated with the value-bearing symbols 530 and/or updating the award indicators 520 as described herein.

With respect to FIG. 8D, the third bonus game state is the game interface 500 at an immediately subsequent game cycle outcome to the game cycle outcome shown in FIG. 8C. In between the game cycle outcomes, the award indicators 520 has been replaced and/or reorganized such that columns 504-512 are associated with a new set of award indicators 520. It is to be understood that the new set of award indicators 520 may include the same award values at least partially rearranged and/or new award values replacing one or more preexisting award values. For example, while the award indicators include new values for the first, third, and fifth columns 504, 508, and 512 that were not in the previous game cycle outcome, the second column 506 includes the same award value as the third column 508 in the previous game cycle outcome, and the fourth column 510 retains the same award value between the two game cycle outcomes. The changes to the award indicators 520 may be at least partially random and/or based on one or more events or conditions of the bonus game feature. In one example, the changes are based on random selections from a set of available award values or a range of award values, which may include at least one jackpot award or elevated award (e.g., the 2500 award). In another example, the award indicators 520 associated with value-bearing symbols 530 populating the array 502 are changed for the next game cycle outcome while the remaining award indicators 520 remain the same. In such an example, the first and fourth columns 504, 510 would change in value while the remaining columns would remain the same between the game cycle outcomes of FIGS. 8C and 8D. The display device is configured to convey the changes to the award indicators 520 to the player through one or more animations and/or presentation elements.

Play of the bonus game feature continues until a termination condition is met. In the example embodiment, the termination condition is expiration of the predetermined number of game cycle outcomes indicated by the game cycle counter 522. In other embodiments, additional or alternative termination conditions are incorporated within the bonus game feature.

The embodiments of the present invention provide innovative procedures for aggregating values of symbols in a symbol array and applying dynamic modifiers. Game-logic circuitry executing instructions in accordance with the embodiments present a visual display of a dynamic symbol array that changes in response to clearly enumerated symbology, provides awards based on array configuration, and resets to random initial states. An observer experiences excitement and anticipation as changes to the array are shown and progress towards awards are visibly apparent. In stark contrast to conventional reel-spinning games in which symbol images are evaluated for winning combinations by paytable rules, the disclosed embodiments with dynamic array configurations and/or value-bearing symbols provide immediately recognizable values in WYSIWYG display configurations while adding variability as to how the values to be awarded to the player are selected and accumulated.

The dynamic array change and value-bearing symbol procedures may be symbol- and game-agnostic. Themes and imagery of symbols and environment may be varied with no effect on the dynamic array change and value-bearing symbol processes. Or, if so desired, the criteria for dynamic array changes and value-bearing symbols may be modified in innumerable ways to produce new visual/animation effects and exciting summation sequences.

Further benefits are realized in increased computer processing efficiency, fewer rules to be evaluated, and simpler graphical representations. For example, in a conventional paytable evaluation, overlapping payline sections require multiple evaluation steps. Often, analysis is required to determine which payline results in the highest credit total, with the lesser value paylines being discarded but only after being evaluated—all this adds to processing overhead. Special symbols like wilds, multipliers, and scatter symbols can modify paytable values and may require separate, additional evaluation according to customized rule sets. All these procedures can be inherently more complex than simple array changes and aggregation (i.e., addition) of number values. The embodiments disclosed herein represents a win-win: simpler, almost self-explanatory graphics combined with faster, more efficient processing. The inventive array changes and value-aggregation procedures through symbol collection can be implemented on the vast majority of casino gaming machines without requiring upgrades or modifications.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The invention claimed is:

1. A gaming machine primarily configured to conduct a game, the gaming machine comprising:

at least one electronic display device configured to present a graphical game interface including a symbol array comprising a plurality of symbol positions divided into a plurality of position subsets; and game-logic circuitry in communication with the electronic display device, the game-logic circuitry configured to:

cause the at least one electronic display device to present the symbol array in a first initial state for initiation of the game, the first initial state including the plurality of symbol positions organized into the plurality of position subsets in a first configuration;

cause the at least one electronic display device to present one or more game cycle outcomes by animating the plurality of symbol positions being populated with a plurality of randomly selected symbols from one or more sets of available symbols for each of the one or more game cycle outcomes;

cause the at least one electronic display device to animate the graphical game interface to expand a first position subset of the plurality of position subsets to include at least one expanded symbol position following a trigger event associated with the first position subset occurring within the one or more game cycle outcomes; and cause the at least one electronic display device to animate, via the graphical game interface, the symbol array transitioning from a final state associated with a reset condition from the one or more game cycle outcomes to a second initial state by replacing the plurality of symbol positions in the final state with a plurality of symbol positions of a second initial state selected at least partially randomly from a plurality of available initial states of the symbol array prior to presenting a subsequent game outcome presentation, the plurality of symbol positions of the second initial state organized in a second configuration different from the first configuration, wherein the first position subset and a second position subset of the plurality of position subsets have a different number of symbol positions within the second configuration.

2. The gaming machine of claim 1, wherein the symbol array in the first initial state has a different number of symbol positions relative to the symbol array in the second initial state.

3. The gaming machine of claim 1, wherein the first initial state is randomly selected from the plurality of available initial states of the symbol array.

4. The gaming machine of claim 1, wherein the first position subset in the first initial state includes a different number of symbol positions relative to the first position subset in the second initial state.

5. The gaming machine of claim 1, wherein the game-logic circuitry is configured to cause the at least one electronic display device to animate, via the graphical game interface, the symbol array transitioning from a second final state associated with a second reset condition to a third initial state of the plurality of available initial states in response to one or more game events associated with the third initial state occurring from the transition to the second initial state to the second final state.

6. The gaming machine of claim 1, wherein the first position subset and the second position subset include the same number of symbol positions in the first configuration.

7. The gaming machine of claim 1, wherein the reset condition includes expiration of a predetermined number of game cycle outcomes.

8. A method for operating a gaming machine of a gaming system, the gaming system including game-logic circuitry and at least one electronic display device of the gaming machine, the method comprising:

presenting, by the at least one electronic display device, a graphical game interface of a game, the graphical game interface including a symbol array comprising a plurality of symbol positions divided into a plurality of position subsets;

causing, by the game-logic circuitry, the at least one electronic display device to present the symbol array in a first initial state for initiation of the game, the first initial state including the plurality of symbol positions organized into the plurality of position subsets in a first configuration;

causing, by the game-logic circuitry, the at least one electronic display device to present one or more game cycle outcomes by animating the plurality of symbol positions being populated with a plurality of randomly selected symbols from one or more sets of available symbols for each of the one or more game cycle outcomes;

causing, by the game-logic circuitry, the at least one electronic display device to animate the graphical game interface to expand a first position subset of the plurality of position subsets to include at least one expanded symbol position following a trigger event associated with the first position subset occurring within the one or more game cycle outcomes; and causing, by the game-logic circuitry, the at least one electronic display device to animate, via the graphical game interface, the symbol array transitioning from a final state associated with a reset condition from the one or more game cycle outcomes to a second initial state by replacing the plurality of symbol positions in the final state with a plurality of symbol positions of a second initial state selected at least partially randomly from a plurality of available initial states of the symbol array prior to presenting a subsequent game outcome presentation, the plurality of symbol positions of the second initial state organized in a second configuration different from the first configuration, wherein the first position subset and a second position subset of the plurality of position subsets have a different number of symbol positions within the second configuration.

9. The method of claim 8, wherein the symbol array in the first initial state has a different number of symbol positions relative to the symbol array in the second initial state.

10. The method of claim 8, wherein the first initial state is randomly selected from the plurality of available initial states of the symbol array.

11. The method of claim 8, wherein the first position subset in the first initial state includes a different number of symbol positions relative to the first position subset in the second initial state.

12. The method of claim 8 further comprising causing, by the game-logic circuitry, the at least one electronic display device to animate, via the graphical game interface, the symbol array transitioning from a second final state associated with a second reset condition to a third initial state of the plurality of available initial states in response to one or more game events associated with the third initial state occurring from the transition to the second initial state to the second final state.

13. The method of claim 8, wherein the first position subset and the second position subset include the same number of symbol positions in the first configuration.

14. The method of claim 8, wherein the reset condition includes expiration of a predetermined number of game cycle outcomes.

15. A gaming system comprising:

a gaming machine primarily configured to conduct a game, the gaming machine comprising at least one electronic display device configured to present a graphical game interface including a symbol array comprising a plurality of symbol positions divided into a plurality of position subsets; and game-logic circuitry in communication with the at least one electronic display device, the game-logic circuitry configured to:

cause the at least one electronic display device to present the symbol array in a first initial state for initiation of the game, the first initial state including the plurality of symbol positions organized into the plurality of position subsets in a first configuration;

cause the at least one electronic display device to present one or more game cycle outcomes by animating the plurality of symbol positions being populated with a plurality of randomly selected symbols from one or more sets of available symbols for each of the one or more game cycle outcomes;

cause the at least one electronic display device to animate the graphical game interface to expand a first position subset of the plurality of position subsets to include at least one expanded symbol position following a trigger event associated with the first position subset occurring within the one or more game cycle outcomes; and cause the electronic display device to animate, via the graphical game interface, the symbol array transitioning from a final state associated with a reset condition from the one or more game cycle outcomes to a second initial state by replacing the plurality of symbol positions in the final state with a plurality of symbol positions of a second initial state selected at least partially randomly from a plurality of available initial states of the symbol array prior to presenting a subsequent game outcome presentation, the plurality of symbol positions of the second initial state organized in a second configuration different from the first configuration, wherein the first position subset and a second position subset of the plurality of position subsets have a different number of symbol positions within the second configuration.

16. The gaming system of claim 15, wherein the symbol array in the first initial state has a different number of symbol positions relative to the symbol array in the second initial state.

17. The gaming system of claim 15, wherein the first initial state is randomly selected from the plurality of available initial states of the symbol array.

18. The gaming system of claim 15, wherein the first position subset in the first initial state includes a different number of symbol positions relative to the first position subset in the second initial state.

19. The gaming system of claim 15, wherein the game-logic circuitry is configured to cause the at least one electronic display device to animate, via the graphical game interface, the symbol array transitioning from a second final state associated with a second reset condition to a third initial state of the plurality of available initial states in response to one or more game events associated with the third initial state occurring from the transition to the second initial state to the second final state.

20. The gaming system of claim 15, wherein the first position subset and the second position subset include the same number of symbol positions in the first configuration.

21. The gaming system of claim 15, wherein the reset condition includes expiration of a predetermined number of game cycle outcomes.

* * * * *